US011144667B2

(12) United States Patent
Lerner et al.

(10) Patent No.: US 11,144,667 B2
(45) Date of Patent: Oct. 12, 2021

(54) MACHINE-DRIVEN CROWD-DISAMBIGUATION OF DATA RESOURCES

(71) Applicant: VIASAT, INC., Carlsbad, CA (US)

(72) Inventors: David F Lerner, Newton, MA (US); Peter J Lepeska, Boston, MA (US); Douglas C Larrick, Newton, MA (US); Devin R Toth, Quincy, MA (US)

(73) Assignee: VIASAT, INC., Carlsbad, CA (US)

( * ) Notice: Subject to any disclaimer, the term of this patent is extended or adjusted under 35 U.S.C. 154(b) by 47 days.

(21) Appl. No.: 16/521,064

(22) Filed: Jul. 24, 2019

(65) Prior Publication Data

US 2020/0125759 A1    Apr. 23, 2020

Related U.S. Application Data

(63) Continuation of application No. 15/758,918, filed as application No. PCT/US2015/050021 on Sep. 14, 2015, now Pat. No. 10,387,676.

(51) Int. Cl.
*G06F 21/62* (2013.01)
*G06F 16/957* (2019.01)
(Continued)

(52) U.S. Cl.
CPC ...... *G06F 21/6245* (2013.01); *G06F 16/9574* (2019.01); *G06F 21/6263* (2013.01);
(Continued)

(58) Field of Classification Search
CPC .................................................. G06F 21/6245
See application file for complete search history.

(56) References Cited

U.S. PATENT DOCUMENTS 6,085,193 A    7/2000  Malkin et al.
8,335,838 B2  12/2012  Zhang et al.
(Continued)

OTHER PUBLICATIONS

U.S. Appl. No. 15/758,918, Notice of Allowance dated Apr. 3, 2019, 11 pages.

(Continued)

*Primary Examiner* — Harris C Wang
(74) *Attorney, Agent, or Firm* — Chang & Hale LLP

(57) ABSTRACT

Embodiments seek to protect privacy of potentially sensitive client resources in web transactions using crowd-disambiguation. Crowd-disambiguation machines can aggregate information about resources from multiple clients as resource fingerprints, and can use the fingerprints to provide crowd-sourced services in a privacy-protected manner. For example, embodiments can communicate a resource fingerprint as a fully ambiguated resource instance (FARI) and a partially disambiguated resource instance (PDRI). When one (or few) clients communicates the resource fingerprint, the identity of the resource remains obfuscated from the crowd-disambiguation machine. As more clients communicate fingerprints for the same resource (e.g., identified by the matching FARIs), respectively, differently generated PDRIs of those fingerprints enable the crowd-disambiguation machine to resolve further portions of the resource, ultimately permitting the resource to be revealed and considered non-private (e.g., for use in hint generation or other crowd-sourced services).

20 Claims, 10 Drawing Sheets

(51) Int. Cl.
*H04L 29/08* (2006.01)
*H04L 9/06* (2006.01)
*H04L 12/911* (2013.01)
*H04L 29/06* (2006.01)

(52) U.S. Cl.
CPC ...... *H04L 67/2847* (2013.01); *H04L 67/2852* (2013.01); *H04L 9/0643* (2013.01); *H04L 47/70* (2013.01); *H04L 67/42* (2013.01)

(56) References Cited

U.S. PATENT DOCUMENTS

| | | | |
|---|---|---|---|
| 8,341,245 B1 | 12/2012 | Roskind et al. | |
| 8,478,843 B1 | 7/2013 | Ortlieb et al. | |
| 8,561,185 B1* | 10/2013 | Muthusrinivasan | G06F 21/6245 726/22 |
| 9,037,638 B1* | 5/2015 | Lepeska | H04L 67/2847 709/203 |
| 9,083,583 B1 | 7/2015 | Roskind et al. | |
| 9,135,364 B1 | 9/2015 | Sundaram et al. | |
| 9,146,909 B2* | 9/2015 | Khorashadi | G06F 16/94 |
| 10,181,019 B2* | 1/2019 | Barday | G06F 11/3438 |
| 10,387,676 B2 | 8/2019 | Lerner et al. | |
| 10,491,703 B1* | 11/2019 | Lepeska | H04L 67/2847 |
| 2002/0010761 A1 | 1/2002 | Carneal et al. | |
| 2006/0294223 A1* | 12/2006 | Glasgow | H04L 67/02 709/224 |
| 2008/0114773 A1 | 5/2008 | Choi et al. | |
| 2012/0084348 A1* | 4/2012 | Lee | G06Q 30/0241 709/203 |
| 2012/0284597 A1* | 11/2012 | Burkard | G06F 16/9574 715/205 |
| 2013/0226992 A1* | 8/2013 | Bapst | H04L 67/10 709/203 |
| 2013/0297561 A1* | 11/2013 | Mizrotsky | G06F 16/245 707/609 |
| 2014/0172453 A1* | 6/2014 | Bar-or | G16H 10/60 705/3 |
| 2014/0279851 A1* | 9/2014 | Rangarajan | H04L 67/04 707/609 |
| 2014/0280838 A1* | 9/2014 | Finn | H04L 49/00 709/223 |
| 2015/0058358 A1* | 2/2015 | Xu | G06F 16/335 707/748 |
| 2015/0156194 A1 | 6/2015 | Modi et al. | |
| 2015/0188949 A1* | 7/2015 | Mahaffey | H04W 12/37 726/1 |
| 2015/0350370 A1* | 12/2015 | Lepeska | G06F 16/957 709/219 |
| 2016/0117355 A1* | 4/2016 | Krishnamurthy | H04L 67/22 707/749 |
| 2016/0203337 A1* | 7/2016 | Dubovsk | G06F 16/215 726/30 |
| 2016/0217294 A1* | 7/2016 | Hornquist Astrand | H04L 63/06 |
| 2016/0371507 A1* | 12/2016 | Jakobsson | H04L 43/06 |
| 2017/0034302 A1* | 2/2017 | Han | H04L 67/2842 |
| 2017/0187536 A1* | 6/2017 | Meriac | G06F 12/0813 |
| 2017/0277908 A1* | 9/2017 | Danielson | G06F 21/6245 |
| 2018/0115625 A1* | 4/2018 | Livneh | H04W 12/02 |
| 2018/0247076 A1* | 8/2018 | Lerner | G06F 21/6263 |
| 2018/0288089 A1* | 10/2018 | Manthena | G06F 16/258 |

OTHER PUBLICATIONS

International Application No. PCT/US2015/050021, International Preliminary Report on Patentability dated Mar. 29, 2018, 9 pages.
International Application No. PCT/US2015/050021, International Search Report and Written Opinion dated Dec. 8, 2015, 11 pages.

* cited by examiner

MACHINE-DRIVEN CROWD-DISAMBIGUATION OF DATA RESOURCES

FIELD

Embodiments relate generally to network communications performance, and, more particularly, to machine-driven crowd-disambiguation of network resources.

BACKGROUND

Web page transmission, in which a user selects web page content and receives objects, is a core part of the Internet experience for Internet users. While the experience of users is typically a single selection followed by the viewing of a web page that is presented on the screen, the process of presenting the web page on the screen can involve a large number of resources (e.g., page objects) and multiple request/response round-trip communications from the user system to one or more web servers that are providing resources for the web page. Additionally, each resource may be associated with a number of different phases as part of the inclusion of the resource (or an object associated with the resource) in a web page that is presented to a user. Each resource that is part of a web page and each phase associated with each resource may contribute to an overall page load time that is experienced by a device user as delay.

Various techniques permit information to be sent to browsers regarding the resources used to render a web page ("hints"), and the browsers can use those hints to improve the loading time for that web page. In some instances, resource information captured from web page loading by a first user can inform hints provided to a second user. In such instances, the hints provided to the second user can potentially indicate sensitive information about the first user (e.g., personally identifiable information (PII), sensitive personal information (SPI), etc.), which may be undesirable. Such web page hinting provides one example of an application that exploits crowd-sourced information to improve performance, and thereby opens the possibility of unintentionally sharing sensitive information between users.

BRIEF SUMMARY

Among other things, systems and methods are described for improving web page loading time using privacy-protected, machine-driven crowd-disambiguation of network resources. Some embodiments operate in context of client computers having page renderers in communication, over a communications network, with content servers and crowd-disambiguation machines. The crowd-disambiguation machines can collect information about resources used in a network transaction (e.g., to render web pages) as it receives resource fingerprints involved with hinting requests and/or hinting feedback, and can use the collected information from the resource fingerprints to provide a service relating to the network transaction (e.g., to generate hints for use in subsequent rendering of web pages). Some embodiments assume a priori that resources invoked by the resource fingerprints potentially indicate private user information. Rather than communicating a resource fingerprints (and potentially private user information) to the crowd-disambiguation machine in an identifiable manner, embodiments can communicate a resource fingerprint as a fully ambiguated resource instance (FARI) (e.g., a cryptographic hash of the resource) and a partially disambiguated resource instance (PDRI) (e.g., a lossy transform of the resource that deterministically resolves only a portion of the resource).

Thus, when a single client (or relatively few clients) communicates the resource fingerprint, the identity of the resource remains obfuscated from the crowd-disambiguation machine. As more clients communicate fingerprints referring to the same resource (e.g., identified by the matching FARIs), respective, differently generated PDRIs of those fingerprints enable the crowd-disambiguation machine to resolve further portions of the resource (i.e., of the identity of the resource). After some number of resource fingerprints is received from different clients by the crowd-disambiguation machine for the same resource, the crowd-disambiguation machine can concurrently consider the resource as resolved (e.g., based on an aggregate of the resolved portions from the PDRIs) and as non-private (e.g., whitelisted, or the like). In effect, when a resource is more private, it will tend to be requested by fewer different clients, which will make it less likely to be resolved to the crowd-disambiguation machine, which will more likely keep it private from the crowd-disambiguation machine. As a corollary, when a resource is less private, it will tend to be requested by more different clients, which will resolve it more quickly to the crowd-disambiguation machine, thereby rendering it non-private to the crowd-disambiguation machine.

BRIEF DESCRIPTION OF THE DRAWINGS

The present disclosure is described in conjunction with the appended figures.

Figure 1:
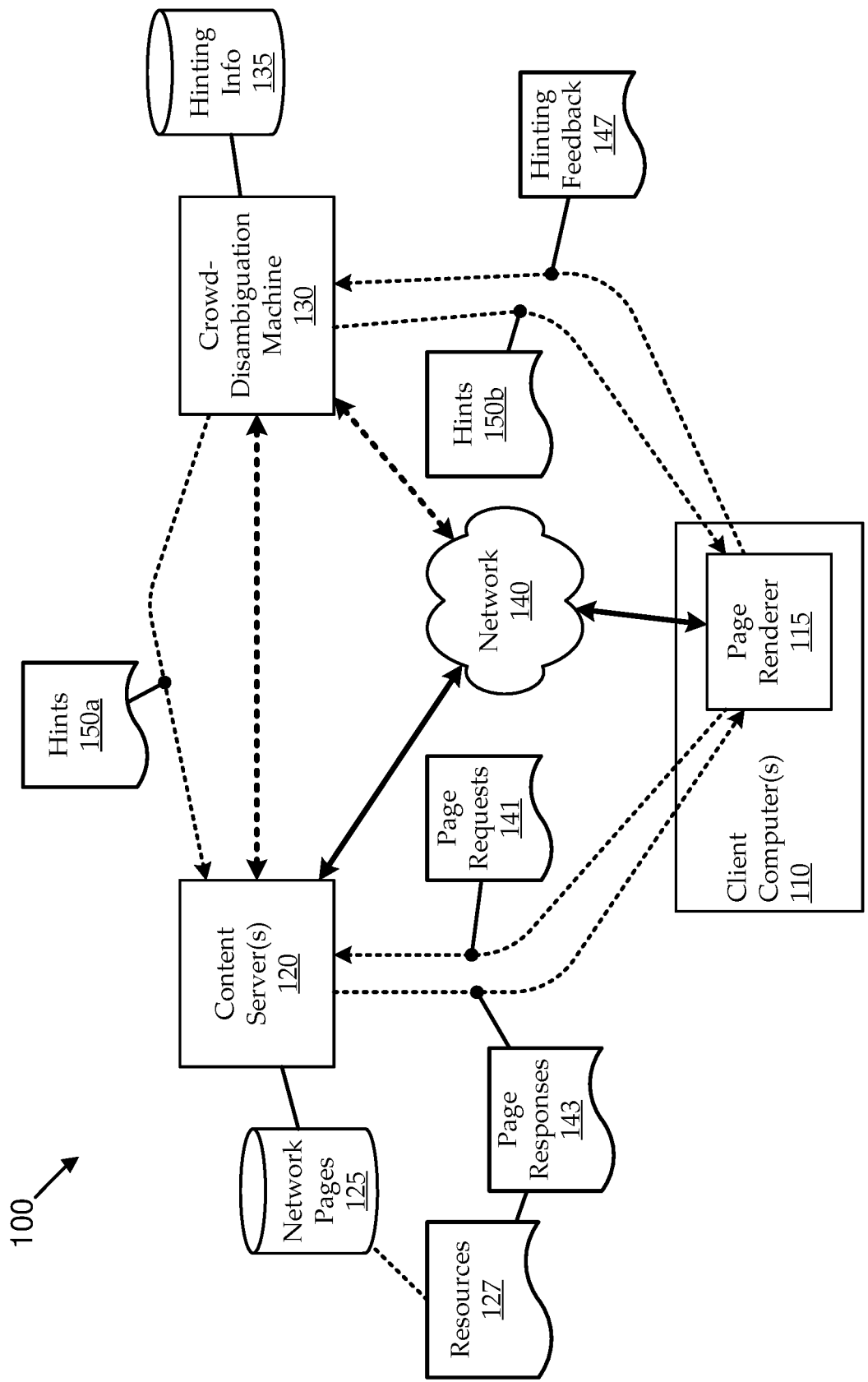
FIG. 1 shows an illustrative communications system environment that provides a context for various embodiments.

In the appended figures, similar components and/or features can have the same reference label. Further, various components of the same type can be distinguished by following the reference label by a second label that distinguishes among the similar components. If only the first reference label is used in the specification, the description is applicable to any one of the similar components having the same first reference label irrespective of the second reference label.

DETAILED DESCRIPTION

In the following description, numerous specific details are set forth to provide a thorough understanding of the present invention. However, one having ordinary skill in the art should recognize that the invention can be practiced without these specific details. In some instances, circuits, structures, and techniques have not been shown in detail to avoid obscuring the present invention.

Embodiments operate in context of crowd-sourced applications that use aggregated information from multiple "clients" in a communications network to provide functionality to those clients and/or other clients in the network. As used herein, terms like "client" and "server" are used to clarify roles of machines in transactions and are not intended to limit the embodiments to any particular network architectures, protocols, etc. For example, in some implementations, a client machine and a server machine can interact in a "client-server" context (e.g., a client-server architecture using client-server types of protocols). Other implementations can operate in a peer-to-peer context, or any other suitable context. In such contexts, a particular machine can act as a client or a server for a particular transaction (i.e., the same machine can operate as a "client" for one transaction and as a server for another transaction, according to peer-to-peer and/or other protocols).

Crowd-sourced applications can give rise to the possibility of inadvertently providing one client with access to (or knowledge of) another client's sensitive information. Accordingly, novel techniques are described herein for protecting privacy of client resources (e.g., any suitable data elements, such as web page resources) in context of such crowd-sourced applications. The term "resource" is used generally herein to refer either to a data element (e.g., a file, etc.), a collection of data elements (e.g., a web page, etc.), or an identifier of a data element or collection of data elements (e.g., a uniform resource locator (URL), etc.). Some embodiments use machine-driven crowd-disambiguation of client resources both to determine when to treat a client resource as non-sensitive and to preserve the sensitivity of that client resources until it is determined as non-sensitive. Client machines can communicate resource fingerprints (e.g., resource requests, resource loading feedback, and/or any other crowd-sourcing information) to a crowd-disambiguation machine, and the crowd-disambiguation machine can treat some or all resource fingerprints as sensitive until otherwise determined as non-sensitive. For example, each resource fingerprint is provided to the crowd-disambiguation machine in a manner that associates a deterministically ambiguated indication of the resource (e.g., generated so that different clients will associate the same indication with the same resource) with a partially disambiguated indication of the resource (e.g., generated using a lossy transform, so that different clients will tend to disambiguate different portions of the same resource). The crowd-disambiguation machine can aggregate the resource fingerprints according to the ambiguated indications until the disambiguated portions can be combined to reveal the resource, at which point the server machine can treat the resource as non-sensitive. Subsequently, the server machine can use the revealed, non-sensitive resource for providing crowd-sourced functionality to other clients.

While embodiments described herein can be applied in any suitable crowd-sourcing application environment, the description focuses for the sake of clarity on a machine-driven hinting service. The hinting service provides an illustrative machine-driven crowd-sourced application as a context for describing novel functionality of various embodiments, but the hinting service is not intended to limit the scope of the novel functionality to such a context. For example, embodiments are described herein in context of aggregation of web page resource fingerprints from web page transactions to improve web page loading, while protecting client privacy relating to those indicated resources. However, those and other embodiments can similarly be applied in context of aggregation of any suitable data elements to improve any suitable crowd-sourced functionality.

One example of another crowd-disambiguation context in which various embodiments can be applied involves online voting and/or nomination systems. In some such systems, it can be desirable to collect votes or nominations for candidates (e.g., people product names, etc.) in a manner that avoids exposing the name of any particular candidate until that candidate receives at lease a minimum threshold of votes or nominations. Embodiments described herein can be used to collect votes or nominations in a manner that is obfuscated even from the collector (i.e., the crowd-disambiguation machine), such that there is no requirement for a trusted vote collector, a trusted third party, etc. Further, embodiments can ensure that votes are only tallied when received from unique voters (e.g., attempts to issue multiple votes from the same voter or voting machine can be disregarded and/or tracked). Implementations of crowd-disambiguation, as described herein, can automatically reveal candidate identities (or permit the identities to be revealed) only after a target number of votes from unique voters is received.

Another example of a crowd-disambiguation context in which various embodiments can be applied involves crowd-verification of transactions (e.g., block chain transactions, etc.). Some transactions assume distrust and rely on mass collaboration to provide security. For example, suppose many people are concurrently seeking authentication for a secure asset (e.g., for entry into a secure location, for access to secure files, etc.), and the authentication system is configured so that no one is considered "authenticated" until independently authenticated by a threshold number of unique computers. As each computer finishes its authentication, it can publish its results. Using crowd-disambiguation embodiments described herein, the publication of results can be performed in a manner that obscures the identity of the person being authenticated (e.g., and/or the asset being requested), while allowing each computer's result to be tallied with relevant results from other computers.

Yet another example of a crowd-disambiguation context in which various embodiments can be applied involves automated opt-in to a service. Suppose a service permits a user to access the service anonymously some number of times before requiring that the user reveals his identity. Crowd-disambiguation embodiments described herein can effectively ensure that the identity of the user cannot be revealed (e.g., even if the service is hacked, there is a data breach, etc.) until the user has accessed the service a minimum number of times.

As used herein "web page transaction" refers to a communication between a client computer and a server computer to transfer a plurality of objects to the client computer which may be presented to the user as part of a web page. As used herein, a "web page" is intended to broadly refer to any type of page sent over a communications network and consisting of multiple page resources. For example, the web page can be a typical web page used in World Wide Web communications, a page (e.g., screen) of an application (e.g., an app, etc.), or any other type of web page. Further, reference to "web" is not intended to be limited to the Internet or the World Wide Web; rather, the "web" can include any public or private communications network. Further, the term "page renderer," as used herein, is not intended to be limited to any particular process in a web browser; rather "page renderer" can refer to any process or set of processes used to load and/or render an end-user experience of a web page and its resources in a browser or other application (i.e., "render" and "load" are used herein to generally express formulating the page using the resources). In one example, the web pages can include web browser pages; the page renderer can include a web browser; and the resources can include uniform resource locators (URLs), hypertext markup language (HTML) objects, scripts, cookies, and/or other server-side objects used (e.g., needed in some or all instances) by the web browser to render the web pages. In another example, the web pages can include screens of an app (e.g., or any other application); the page renderer can include the app (e.g., the portion of the app that handles input/output interactions); and the resources can be audiovisual content of the rendered screens. Accordingly, "resources" are intended to generally include any objects used to render a web page and can generally refer to the resource itself (e.g., a URL, script call, etc.), the target of the resource (e.g., an audio and/or video file pointed to by a URL, etc.), and/or sub-resources embedded in other resources (e.g., a URL or script may call one or more other URLs or scripts).

Embodiments are described in context of "hints," "hinting information," and the like. As used herein, hints generally include any information about the resources used to render a web page that are provided to a page renderer (or any suitable component of a client computer or a proxy system of the client computer) to help improve the page load timing for that web page by that page renderer. This information may include a list of all resources requested as part of the transaction, a list of resources needed to present an initial incomplete web page on an output of a client device, a set of cookies (and/or hashed versions of those cookies) associated with the client device or processing operating on the client device, a set of cookies (and/or hashed versions of those cookies) associated with one or more web page resources or client processes, a set of timings associated with each resource, a set of timings associated with the overall page rendering process, a set of relationships between the resources, details associated with cached resources, resource sizes, resource types, resource fingerprints or checksums, resource position on the page, cookie meta-data, redirect chains, alternative content sources user during a transaction such as content delivery networks (CDNs) that may be used for some resources, details of the domains (including number of objects that are expected to be fetched per domain) used during the transaction, secure connection meta-data, secure socket layer (SSL) server certificate and/or revocation list information, and/or any other such details.

In various embodiments, after a page renderer has completed rendering a web page and/or presenting the web page to a user, it can provide hinting feedback information that can include and/or be used to derive any hinting information for subsequent web page transactions (e.g., including any of the hinting information described above). The feedback information can be captured in any suitable manner, including by a client computer, by a page renderer operating on a client device, by a web server, by a proxy server in a communication path between a client device and a web server, by an automated page renderer under control of the a hinting service, or by any other device involved with a web page transaction. The hints can be used to improve web page loading times in web page transactions. For example, the improvement can be realized by lowering an overall time from a user selection via the page renderer to a completed presentation of a web page to a user in response to that selection. This improvement can also be realized by lowering an initial time to presentation of an incomplete version of the web page that may be functional for user purposes. In one potential embodiment, a lowering of the overall time may result from the use of latency information in conjunction with other feedback information to determine how aggressively a page renderer will attempt to prefetch child resources as part of future instances of the web page transaction.

Examples of hints and feedback information may be found in U.S. patent application Ser. No. 14/729,949, titled "SERVER BASED EMBEDDED WEB PAGE FEEDBACK AND PERFORMANCE IMPROVEMENT"; U.S. patent application Ser. No. 13/372,347, titled "BROWSER BASED FEEDBACK FOR OPTIMIZED WEB BROWSING"; U.S. Pat. No. 9,037,638, titled "ASSISTED BROWSING USING HINTING FUNCTIONALITY"; U.S. patent application Ser. No. 14/212,538, titled "FASTER WEB BROWSING USING HTTP OVER AN AGGREGATED TCP TRANSPORT"; U.S. patent application Ser. No. 14/276,936, titled "CACHE HINTING SYSTEMS"; and U.S. patent application Ser. No. 14/729,949, titled "SERVER-MACHINE-DRIVEN HINT GENERATION FOR IMPROVED WEB PAGE LOADING USING CLIENT-MACHINE-DRIVEN FEEDBACK"; each of which is expressly incorporated by reference for all purposes in this application.

Resources used in such a web page may include HTML files, cascading style sheet (CSS) files, image files, video files, or any other such resources. Reference to different instances of a web page transaction refers to the transaction being performed by different client computer at different times, or the same transaction being performed by a single client computer at different times. These different instances of a web page transaction may include variations in the resources that are part of the web page transaction, either due to customization across different client computers, or updates to the web page over time. Further, different web pages and different web page transactions may include resources that are the same or similar. In certain embodiments, feedback information and hints generated for a resource seen in one web page transaction may be applied as hints in a transaction for a separate web page if the root URLs are similar or if there is a sufficient degree of commonality between the sets of resources is used in both web page transactions. Similarly, as used herein, terms, like "render" and "load" are used broadly (and, in most cases, interchangeably) to refer generally to enabling interaction by a user with a page resource via a page renderer interface. For example, rendering or loading can include displaying and/or formatting in context of static visual content, playing in context of video or audio content, executing in context of code or other scripts, etc.

Further, as used herein, "root" refers to an initial portion of a web page transaction that is initiated directly by a user selection or action. For example, a user clicking on a web page link initiates a root request for that link. The root response is the response directly responding to that root request. The root response also includes a root resource. This root resource includes information that enables a page renderer to identify, either directly or indirectly, the other resources needed to render and present the complete web page. In some instances, the "root" resource can include a primary child resource (e.g., a sub-resource) in an iframe on a page, or the like (e.g., where each of multiple iframes are separately hinted from different content servers).

"Redirect" refers to a response to a root request that directs the requesting client device to a different source for a resource. For example, a client device may send a root request and receive back a redirect response. The client device may then send a redirected child request to the redirect target indicated in the redirect response. In certain embodiments, a response to the redirected child request may then include a feedback script or hints. Thus, while certain embodiments describe operation with a root request and response, in various embodiments, any root, child, or redirected response described herein may include a feedback script as described in the various embodiments herein.

"Child" requests and responses are the follow-on requests and responses that result, either directly or indirectly, from embedded or calculated references to other resources in root resources or other child resources. The child resources, requests, and responses are always one or more steps removed from the user action by a root that directly responds to the user action. Child resources may include references to additional child resources, resulting in a chain of requests and responses. Each of the above requests and responses may be hypertext transport protocol (HTTP) requests and responses including HTTP headers and an associated message. In various embodiments, other communication protocols may be used.

FIG. 1 shows an illustrative communications system environment 100 that provides a context for various embodiments. The communications system environment 100 includes client computer(s) 110, content server(s) 120 (e.g., web servers), and crowd-disambiguation machine(s) 130 in communication over a communications network 140. Network 140 can include any one or more suitable communications networks and/or communications links, including any wide area network (WAN), local area network (LAN), private network, public network (e.g., the Internet), wired network, wireless network, etc. Typically, the communications system environment 100 can include many client computers 110 interfacing with multiple content servers 120 over the communications network 140.

As described herein, according to various embodiments, the content servers 120 can be in communication with one or more crowd-disambiguation machines 130 directly and/or via the communications network 140, and/or the client computers 110 can be in communication with the crowd-disambiguation machines 130 via the communications network 140 (e.g., at the direction of the content servers). Some embodiments are directed to improving the loading and rendering of resources that make up web pages, screens of applications, and/or other similar web page contexts. In such a context, it may be typical for a client computer 110 to make a request for a web page that is provided (e.g., hosted) by a content server 120. Loading and rendering the requested web page can involve subsequently requesting and receiving a number (sometimes a large number) of resources that make up the web page (e.g., visual content, audio content, executable scripts, etc.). Loading and rendering of such a web page can be improved by requesting resources at particular times (e.g., by prefetching resources in a particular order, etc.), and the client computer can be instructed as to such improvements using "hints," as described herein. The resources may be identified in the set of hints by URL, by a combination of URL and regular expression, by a script, or by other similar techniques. Loading and rendering of such a web page can also be improved by hints that support pre-resolving domain names, pre-establishing TCP connections, pre-establishing secure connections, predetermining and minimizing the redirect chain and similar functions that can be performed prior to content load that improve overall page load performance. Additionally, the probability that a resource will be needed and the priority it should be given by the browser may be communicated to further improve page load time. Additionally, the various image, video, and document formats that may be associated with a given resource may be sent to the device in advance as hints, thereby allowing the renderer to dynamically adjust to network conditions and constraints and minimize data traffic associated with prefetched resources. Additionally, hints may guide the selection of CDNs, caches, or other server locations so as to improve page load time.

Client computer(s) 110 can be implemented as any suitable computing device having memory resources, processing resources, and network communication resources. For example, the client computers 110 can be desktop computers, tablet computers, laptop computers, mobile phones, personal data assistants, network enabled wearable devices, network enabled home appliances, etc. Each client computer 110 includes one or more page renderers 115. Page renderer 115 can include any system implemented in a client computer 110 that enables a web page transaction, and that is used, at least in part, for rendering a web page and presenting it to a user via an output device of the client computer 110.

Content server(s) 120 can generally include any one or more computational environments for serving (e.g., hosting and/or otherwise providing access to) web page content to the client computers 110 via the communications network 140. For example, the content servers 120 can include web servers, content distribution networks (CDNs), caches, or the like. As illustrated, the content servers 120 can include, or be in communication with, one or more data storage systems having web pages 125 stored thereon. As described herein, it is assumed that the web pages 125 are made up of multiple resources 127. For example, loading one of the web pages 125 can involve requesting, receiving, and rendering the resources 127 that make up the web page 125. Some or all of the resources 127 of the web pages 125 served by the content servers 120 can be stored in the data storage systems, or some or all of the resources 127 can be stored remote from the content servers 120.

The one or more crowd-disambiguation machines 130 can be implemented as one or more stand-alone server computers, as part of one or more content servers 120, and/or in any other suitable manner for maintaining and updating hinting information 135 (e.g., according to hinting feedback 147 from client computers 110, according to hints 150 computed from the hinting information 135, etc.). The hinting information 135 can be stored in one or more data stores that are part of, coupled with, or in communication with the crowd-disambiguation machines 130, or in any other suitable manner Embodiments support many different types of hinting information 135 and hints 150 generated therefrom, including, for example, information relating to which page objects 127 are needed to render the web pages 125, timing information relating to those page objects 127 (e.g., the order and timing by which the page objects 127 should be requested), etc. The hinting information 135 can be maintained, computed, updated, etc. in any suitable manner, including according to the hinting feedback 147 received from one or more client computers 110. Embodiments of the crowd-disambiguation machine 130 apply machine learning techniques to hinting feedback 147 from multiple related web page transactions (e.g., from multiple instances of multiple client computers 110 rendering the same (or sufficiently similar) web pages). Received hinting feedback 147 can be used to refine, hone, update, reinforce, or otherwise improve machine-driven hinting models maintained by the crowd-disambiguation machine 130, thereby facilitating generation and communication of optimized hints.

The client computers 110 can render requested web pages 125 according to hints 150 generated from the hinting information 135 that effectively predict which resources 127 the client computers 110 will need at which times to optimally render the web pages 125; the client computers 110 can actually render the web pages 125 according at least to the received hints 150; the actual rendering of the web pages 125 can be monitored by the client computers 110 to determine which resources 127 were actually used to render the pages according to which timings; and the monitored information can be fed back (i.e., as the hinting feedback 147) to the crowd-disambiguation machines 130 for use in updating the hinting information 135 and refining future hint 150 generation.

Some embodiments generate and handle hints in a manner that is computationally generated (e.g., generated by machine based on feedback and analysis, as opposed to being generated manually by coders based on assumptions). Computational hint generation can involve communicating resource fingerprints from a first client computer 110 to a crowd-disambiguation machine 130, and using the crowd-disambiguation machine 130 to provide hints that invoke those indicated resources back to a second client computer 110. In such instances, the hints provided to the second client computer 110 can potentially indicate sensitive information about a user of the first client computer 110 (e.g., personally identifiable information (PII), sensitive personal information (SPI), etc.), which may be undesirable. "Private," "sensitive," and/or other similar terms applied to resources and related data and functionality is intended herein broadly to include personally identifiable information (PII), sensitive personal information (SPI), and/or other types of information a user may desire to keep from being communicated to other users as part of hints.

Embodiments described herein seek to improve web page loading time (and, thereby, end user experience) using hint generation based on privacy-protected client hinting requests and/or feedback. For example, some or all resources used to render a web page (e.g., uniform resource locators (URLs), scripts, etc.) can be considered a priori as private, such that a particular resource potentially indicates sensitive information about the client user who indicated the resource (e.g., either as part of a hinting request or as part of hinting feedback). Accordingly, the resource fingerprint can be communicated from the client to a crowd-disambiguation machine in an ambiguated manner. In some embodiments, the resource fingerprint can be a fully ambiguated resource instance (FARI) (e.g., a cryptographic hash of the resource) and a partially disambiguated resource instance (PDRI) (e.g., a lossy transform of the resource that deterministically resolves only a portion of the resource). Thus, when a single client (or relatively few clients) communicates the resource fingerprint, the identity of the resource is obfuscated from the crowd-disambiguation machine. As more clients communicate indications of the same resource (e.g., identified by the matching FARIs), respective, differently generated PDRIs of those indications can resolve (i.e., reveal) further portions of the resource to the crowd-disambiguation machine. After some number of resource fingerprints is received from different clients by the crowd-disambiguation machine for the same resource, the crowd-disambiguation machine can concurrently consider the resource as resolved (e.g., based on an aggregate of the resolved portions from the PDRIs) and as non-private (e.g., whitelisted, or the like). In effect, when a resource is more private, it will tend to be requested by fewer different clients, which will make it less likely to be resolved to the crowd-disambiguation machine, which will more likely keep it private from the crowd-disambiguation machine. As a corollary, when a resource is less private, it will tend to be requested by more different clients, which will resolve it more quickly to the crowd-disambiguation machine, thereby rendering it non-private to the crowd-disambiguation machine.

Figure 2:
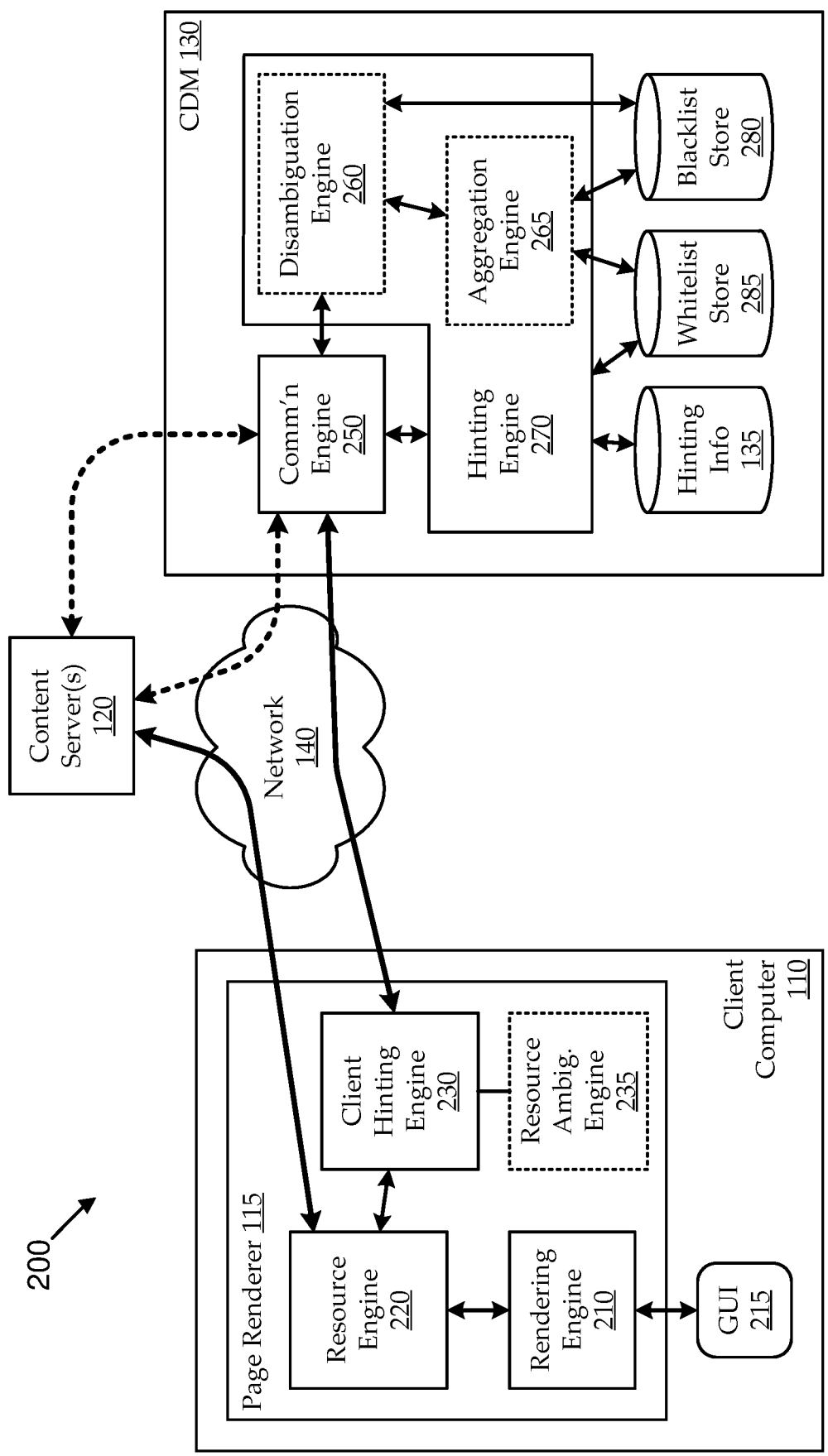
FIG. 2 shows a block diagram of a portion of an illustrative communications environment for implementing privacy-protected hint generation, according to various embodiments.

FIG. 2 shows a block diagram of a portion of an illustrative communications environment 200 for implementing privacy-protected hint generation, according to various embodiments. FIG. 2 shows a client computer 110 in communication with a crowd-disambiguation machine 130 over a network 140, which can be an implementation of the system described above with reference to FIG. 1. Some of the descriptions involve communications between components of the client computer 110 and components of the crowd-disambiguation machine 130, however these are intended only as a general illustrations of functionality and connectivity. As described with reference to FIG. 1, and as generally shown in FIG. 2, the crowd-disambiguation machine 130 can be in direct communication (over the network 140) with the client computer 110, in communication with the client computer 110 only via one or more content servers 120 (e.g., where the crowd-disambiguation machine 130 is in communication with the content servers 120 over one or more networks 140 and/or is part of one or more of the content servers 120), in communication with one or more content servers 120 and the client computer 110 over one or more networks 140, etc. For example, hinting functionality can be handled between the client computer 110 and the crowd-disambiguation machine 130 either without involving any content servers 120, only by going through one or more content servers 120, or in any suitable combination.

As illustrated, the client computer 110 can include a page renderer 115, such as a web browser. Embodiments of the page renderer 115 can include a rendering engine 210, a resource engine 220, and a client hinting engine 230. The rendering engine 210 can render resources of a web page for consumption (e.g., display, etc.) via a graphical user interface (GUI) 215 of the client computer 110. For example, the rendering engine 210 can process HTML code, scripts, page objects, etc. to effectively provide a user experience of web pages via the GUI 215.

When a web page is requested, the resource engine 220 can generate requests for resources of the requested web page, communicate those requests to one or more content servers 120 over the network 140, receive the resources in response to the requests, and process the responses. For the sake of illustration, a user can request a web page via the GUI 215 (e.g., by entering a web address), the resource engine 220 can obtain some or all of the resources needed to render the requested web page (e.g., according to HTML code, scripts, cookies, page objects, etc.), and the rendering engine 210 can process the obtained resources to effectively provide a user experience of the requested web page via the GUI 215 (by rendering the web page using the resources).

Embodiments of the page renderer 115 can exploit hints, as described herein, using the client hinting engine 230. Hinting functionality can be exploited at any or all of a number of stages in a web transaction. One stage is a web page request stage, during which various resource requests can be made to one or more content servers 120 (e.g., by the resource engine 220), and requests comparable to those resource requests can be made to the client hinting engine 230 for hints relating to those resources (e.g., by the client hinting engine 230). For example, in response to a user requesting a web page, the resource engine 220 can begin requesting URLs (e.g., the root URL and child URLs), and the client hinting engine 230 can issue one or more requests indicating those URLs to the crowd-disambiguation machine 130 seeking relevant hints. Another stage is a feedback stage. While the resources for a web page are being loaded, while the page is being rendered, etc., the client hinting engine 230 can collect feedback information, as described above (e.g., information on which resources are involved in rendering the web page, timing information relating to the resources, etc.). After the web page has been rendered by the rendering engine 210 (or during rendering, after presentation to the user via the GUI 215, after multiple pages have been rendered and feedback has been aggregated, or at any other suitable time), the client hinting engine 230 can send the hinting feedback to the crowd-disambiguation machine 130 for use in generating future hints for the web page and/or for the resources (e.g., for any web pages that invoke those resources).

Accordingly, at one or more stages of a web page transaction, the client hinting engine 230 can communicate information to the crowd-disambiguation machine 130 that refers to resources being requested (explicitly, e.g., as root requests; or implicitly, e.g., as child requests) by users of client computers 110. In various instances, the resources can provide (or be used to derive) information about the requesting user that may be considered as private or sensitive. In one example, a requested URL can include personally identifiable information, such as a username, coordinates relating to the user, search terms, account number, etc. In another example, a collection of URLs from a particular user may represent browsing history, which can potentially reflect user preferences, demographics, etc. In another example, a user can request certain URLs from within an ostensibly private domain, but the URLs may not, in fact, be private or secured. For example, a user may log into a social networking web site with credentials, thereby being provided with a personal page having personal links (e.g., URLs for stored personal photos, etc.). While those links may not be available from any public-facing web site, they may still be unsecured (e.g., they may be accessible if entered explicitly into a browser). Accordingly, if those links are provided to other users as part of hints, the users may be inadvertently gaining access each other's private information. Particularly in embodiments where hints are machine-generated by the crowd-disambiguation machine 130, it can be difficult for the crowd-disambiguation machine 130 to identify, and to avoid generating hints for, potentially private resources.

Embodiments include a resource ambiguation engine 235 to facilitate privacy-protected hint generation. The resource ambiguation engine 235 can be implemented as a functional component of the client hinting engine 230, or in any other suitable manner. As described above, the resource ambiguation engine 235 can be configured to send some or all resource fingerprints of the client hinting engine 230 in an ambiguated manner (e.g., treating all resources a priori as private, until determined not to be). In some embodiments, when the client hinting engine 230 prepares to communicate a resource fingerprint to the crowd-disambiguation machine 130 (e.g., as part of a hinting request, hinting feedback, etc.), the resource ambiguation engine 235 can generate a fully ambiguated resource instance (FARI) and a partially disambiguated resource instance (PDRI). Rather than communicating a resolved (e.g., human and/or machine-identifiable) resource, the client hinting engine 230 can communicate a resource fingerprint that includes the FARI and the PDRI. The FARI can be generated by applying an ambiguation function to the resource (e.g., using a strong, one-way cryptographic hash, such as MD5), or in any other suitable manner that produces a fully ambiguated, but deterministic and sufficiently unique instance of the resource. For example, it can be desirable to generate the FARI, so that: the crowd-disambiguation machine 130 can determine (with a certain level of confidence) that FARI generated for the same resource by many different resource ambiguation engines 235 all refer to the same underlying resource; but even if the many different resource ambiguation engines 235 independently generate and communicate the FARI to the crowd-disambiguation machine 130, the crowd-disambiguation machine 130 will remain unable (to a certain level of confidence) to identify the underlying resource.

The PDRI can be generated using a lossy transform of the resource, or any other suitable technique that resolves only a portion of the resource (e.g., one or more characters of a URL, etc.). In some implementations, each resource ambiguation engine 235 can be assigned a particular ambiguation schema (e.g., a seed, algorithm, etc.) that ambiguates all but a portion of the resource in a manner that is predictable for that resource ambiguation engine 235. For example, if the same client hinting engine 230 communicates a resource fingerprint to the crowd-disambiguation machine 130 many times for the same resource, the resource ambiguation engine 235 can generate the same PDRI, so that the crowd-disambiguation machine 130 will repeatedly receive only the same resolved portion of the resource. Accordingly, many requests for the same resource from the same client computer 110 will not tend to cause the resource to become resolved (identifiable) to the crowd-disambiguation machine 130. However, if multiple client hinting engines 230 communicates a resource fingerprint to the crowd-disambiguation machine 130 for the same resource, the respective resource ambiguation engines 235 can generate the PDRI differently (e.g., according to their respective ambiguation schemas), so that the resource will become increasingly resolved to the crowd-disambiguation machine 130 with each different PDRI. As such, more private resources can tend to be requested by fewer unique client computers 110, causing less of the resource to be resolved to the crowd-disambiguation machine 130, causing the crowd-disambiguation machine 130 to keep the resource unresolved (i.e., more private, not used in hints, etc.); while less private resources can tend to be requested by more unique client computers 110, causing more of the resource to be resolved to the crowd-disambiguation machine 130, causing the resource to be more likely considered as non-private by the crowd-disambiguation machine 130.

In various embodiments, the resource ambiguation engine 235 can be tuned to generate the PDRI in different ways to yield different results. As one example, each resource ambiguation engine 235 can have a persistent seed, used to initialize a pseudo-random number generator. The random numbers can be used to replace certain bits of the resource (e.g., the URL string's American Standard Code for Information Interchange (ASCII) encoding with noise). Which bits are replaced can depend on the seed, and what percentage of bits are replaced can be a tuning parameter that affects how many different PDRIs are needed (on average) to reconstruct the underlying resource. By informing the crowd-disambiguation machine 130 of each resource ambiguation engine's 235 seed, and using the same pseudo-random number generator across all the resource ambiguation engines 235, the crowd-disambiguation machine 130 can derive which bits are scrambled in a PDRI received from a particular resource ambiguation engine 235. By keeping each seed persistent, repeated requests for the same resource by the same client computer 110 will tend to result in the same PDRI being generated by the resource ambiguation engine 235, thereby contributing no further information to the crowd-disambiguation machine 130 when communicated as part of the resource fingerprint by the client hinting engine 230.

According to some implementations, the probability ("P") of a particular resource being resolved to the crowd-disambiguation machine 130 from received PDRIs can be a function of a fraction of bits disambiguated (resolved) in each PDRI ("k"), the length of the resource string in bits ("U"), and the number of received PDRIs ("N"), as follows:

$$P=[1-(1-k)^N]^U.$$

For the sake of illustration, "k" can be set to 0.5 (i.e., so that 50% of bits are resolved in each PDRI). After a relatively small number of PDRIs is received (e.g., five), the probability of resolving a relatively long resource string (e.g., 128 bytes) is less than two percent, and the probability of resolving even a relatively short resource string (e.g., ten bytes) is only about 73 percent. However, after twenty PDRIs are received, the probability of resolving a resource string is over 99.9 percent, even with a resource string of 1,000 bits. For further illustration, "k" can be tuned to 0.1 (i.e., so that only 10% of bits are resolved in each PDRI). After a relatively small number of PDRIs is received (e.g., five), the probability of resolving even a short resource string approaches zero percent. However, after fifty PDRIs are received, the probability of resolving a relatively short (e.g., ten-byte) resource string is around 95 percent, while the probability of resolving a longer (e.g., 128-bit) resource string is still only around 52 percent. Both cases illustrate that, in these types of implementations, the number of PDRIs received tends to have a greater impact on the probability than does the length of the resource string; so that tuning "k" can effectively define the number of samples needed for confident identification of the resource. Depending on the algorithm used by the resource ambiguation engine 235 to generate the PDRI, different implementations can tune the results in different ways with different outcomes.

Embodiments of the crowd-disambiguation machine 130 can include components for facilitating general hinting functionality and components for facilitating privacy-protected hinting functionality. As illustrated, embodiments of the crowd-disambiguation machine 130 can include a communications engine 250 and a hinting engine 270. The communications engine 250 can handle two-way communications with the network 140, with the client computer 110, with one or more content servers 120, etc. For example, the communications engine 250 can receive hinting requests and/or hinting feedback from client computers 110 and communicate hints to client computers 110, forward hinting requests to content servers 120 and/or receive resource-related and/or hint-related information from content servers 120, etc.

Embodiments of the hinting engine 270 can perform general hinting functions, such as processing hinting feedback to update (e.g., hone, tune, collect, replace, generate, etc.) stored hinting information 135 and using the stored hinting information 135 to generate hints. Embodiments of the hinting engine 270 can include a disambiguation engine 260 and an aggregation engine 265 to facilitate privacy-protected hinting functionality. As described above, client computers 110 can communicate resource fingerprints that include a FARI and a PDRI for invoked resources. These resource fingerprints can be received by the communications engine 250 can processed by the hinting engine 270 to determine whether to generate hints (e.g., if the resource fingerprints are part of hinting requests) and/or whether to use the resource fingerprints for future hint generation (e.g., if the resource fingerprints are part of hinting feedback). For example, the disambiguation engine 260 can use the FARI to match a received resource fingerprint to previously received resource fingerprints (i.e., the FARI is sufficiently deterministic and unique to be comparable across different source client computers 110).

The disambiguation engine 260 can also determine a resolved portion of the invoked resource according to the PDRI of the received resource fingerprint. For example, the disambiguation engine 260 can determine an ambiguation schema used by the resource ambiguation engine 235 that generated the PDRI, which can inform the disambiguation engine 260 as to which portion of the resource is resolved by the PDRI. The ambiguation schema can be determined in any suitable manner. For example, the disambiguation engine 260 can have a lookup table of which schema (e.g., which seeds) are used by which client computers 110, and the disambiguation engine 260 can determine the relevant schema by identifying the client computer 100 that originated the resource fingerprint. In another example, the ambiguation schema can be encoded in the resource fingerprint (e.g., in a header or other metadata of the PDRI) or in a communication sent by the client computer 110 in association with the resource fingerprint.

The aggregation engine 265 can aggregate resolved portions of resources recovered from multiple received PDRIs to form an aggregated resolved portion of the resource. For example, some or all resources can be considered a priori as private, and continue to be considered as private (e.g., are stored as blacklisted resources 280) until a predetermined disambiguation threshold is met. The disambiguation threshold can be any predetermined level of disambiguation of the resource useful for generating hints. For example, the disambiguation threshold can be met when all bits of a resource string are resolved to a predetermined confidence level (e.g., 99.9 percent), when enough bits of a resource string are resolved to enable automatic disambiguation of the remaining bits to a predetermined confidence level (e.g., using machine learning, a dictionary of common terms or URL strings, etc.), when enough bits are resolved to identify a root domain or sub-domain to a predetermined confidence level (e.g., even though dynamically generated and/or other portions of the resource string remain unresolved), etc. When the disambiguation threshold is met, the resources can be considered as non-private and can be stored as whitelisted resources 285.

The blacklisted resources 280, whitelisted resources 285, and hinting information 135 can be stored in any suitable data storage, such as one or more data servers in one or more locations. In some embodiments, the whitelisted resources 285 are consulted prior to performing certain functions of the disambiguation engine 260 and/or the aggregation engine 265. In one implementation, the client hinting engines 230 are updated with a model of the whitelisted resources 285, which can be consulted to determine whether a particular resource is already considered as public. If so, the client hinting engines 230 can request hints for the non-private resources, provide feedback that identifies the non-private resources, etc. without performing ambiguation functions. In another implementation, upon receipt of a resource fingerprint, the hinting engine 270 can consult the whitelisted resources 285 to determine whether the invoked resource is non-private (e.g., the whitelisted resources 285 can be stored in association with their FARI, so they can be identified without disambiguation). If the invoked resource is non-private, an indication can be sent to the client computer 110 to "teach" the client computer 110 to subsequently treat that resource as non-private. In other implementations, in response to receiving a resource fingerprint as part of a hinting request, the hinting engine 270 can determine whether to provide a hinting response to the client computer 110 based on whether the invoked resource is identified as a whitelisted resource 285 (e.g., with or without also performing functions of the disambiguation engine 260 and/or the aggregation engine 265).

Figure 3:
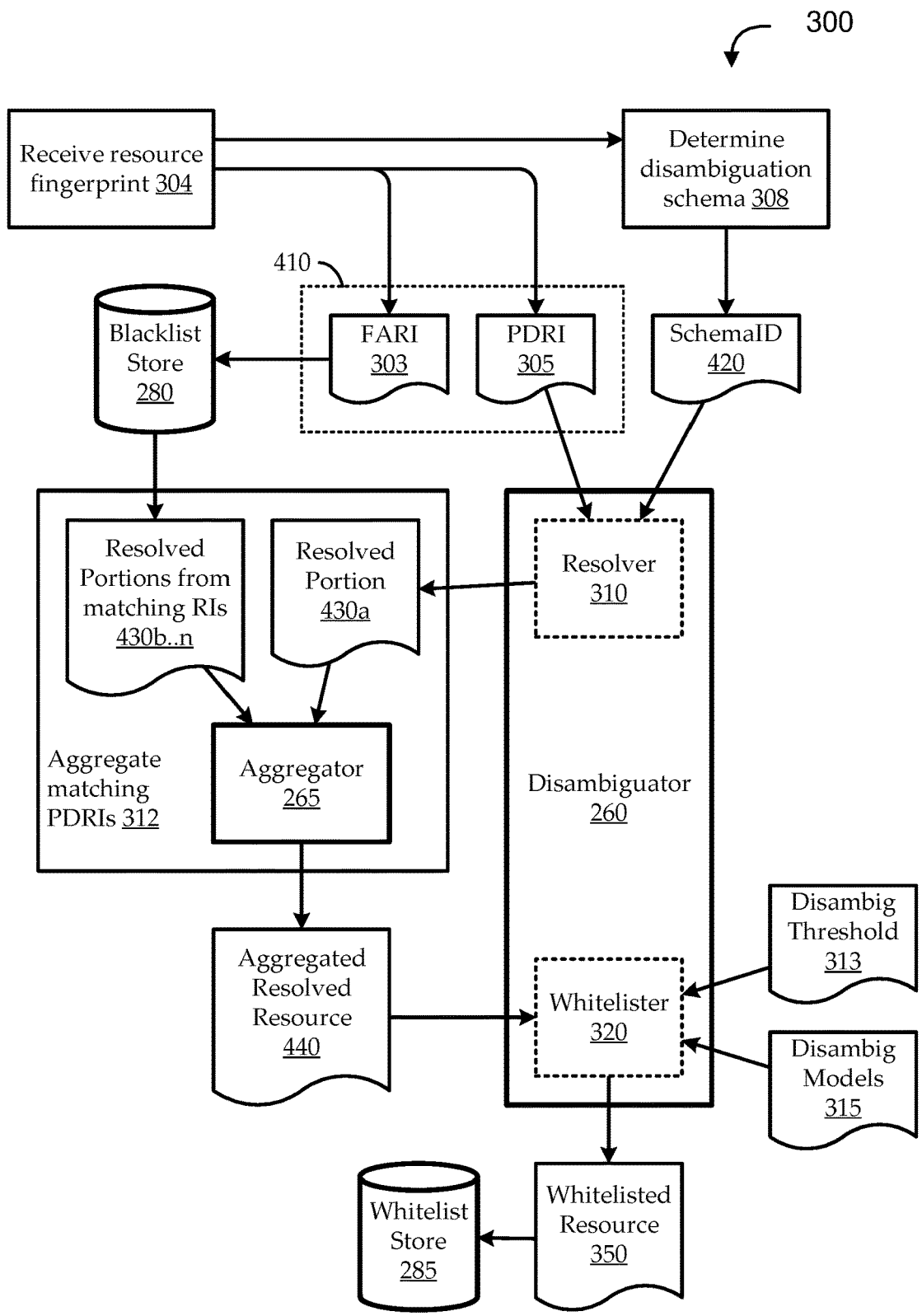
FIG. 3 shows a data flow for an implementation of privacy-protected hinting in an illustrative hinting engine, according to various embodiments.
Figure 4:
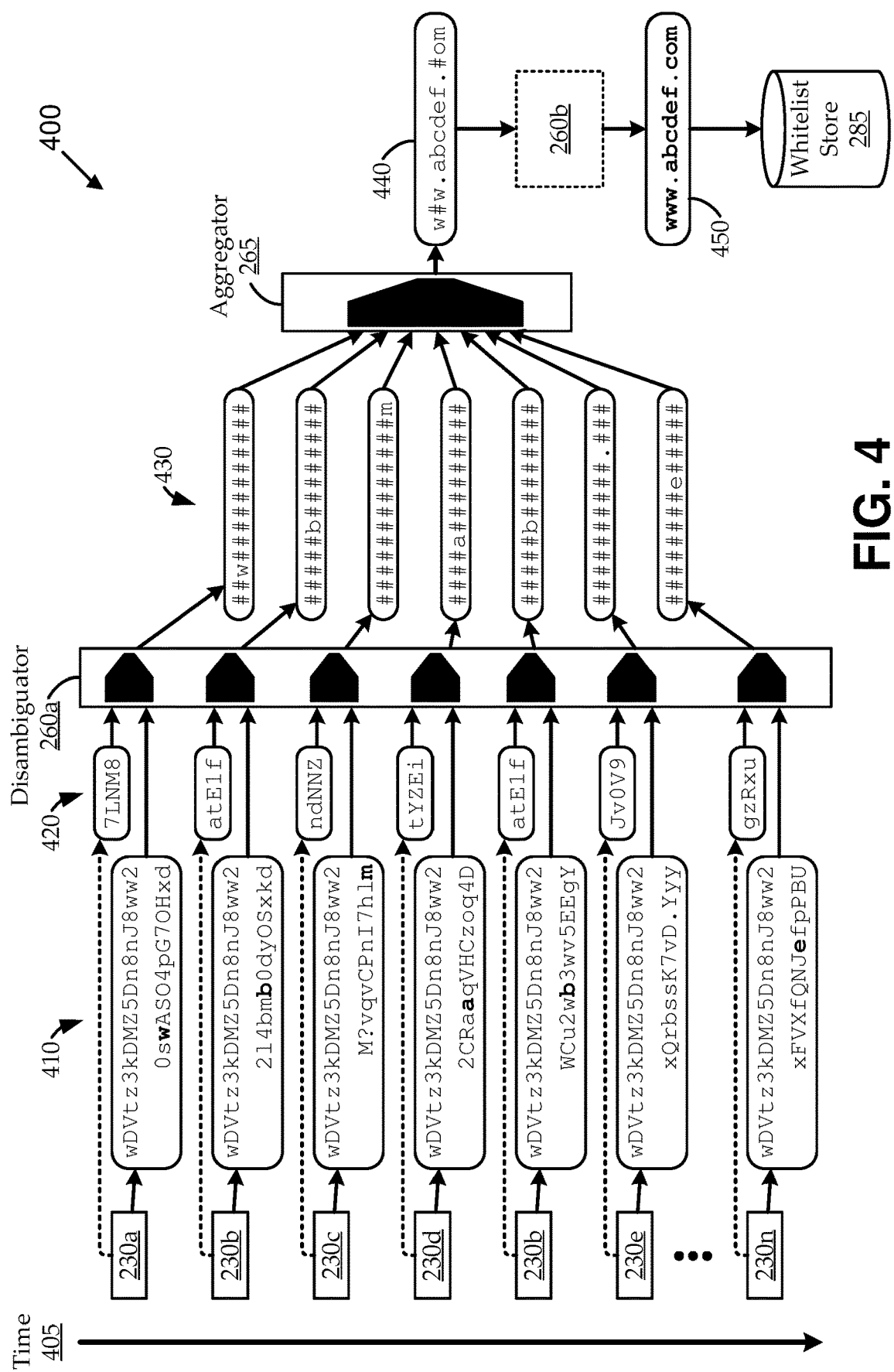
FIG. 4 shows an illustrative scenario that follows the data flow of FIG. 3.

FIG. 3 shows a data flow 300 for an implementation of privacy-protected hinting in an illustrative hinting engine 270, according to various embodiments. Embodiments of the data flow 300 can be implemented in context of the systems described in FIGS. 1 and 2. FIG. 4 shows an illustrative scenario 400 that follows the data flow 300 of FIG. 3. FIGS. 3 and 4 are described in parallel for added clarity. At stage 304 of FIG. 3, a number of resource fingerprints 410 are received by the hinting engine 270. For example, as illustrated in FIG. 4, over a period of time (indicated as arrow 305), the various resource fingerprints 410 can be received from multiple client hinting engines 230 for the same resource.

Each client hinting engine 230 can generate its resource fingerprints 410 to include a FARI 303 and a PDRI 305 for the invoked resources. As shown in FIG. 4, because all the received resource fingerprints 410 in the illustrated example invoke the same resource, each resource fingerprint 410 has the same FARI 303 (shown as the upper string in each resource fingerprint 410). However, the resource fingerprints 410 received from different client hinting engines 230 include different PDRIs 305 (the lower string in each resource fingerprint 410), as they are generated using different ambiguation schemas. At stage 308 of FIG. 3, the hinting engine 270 can identify the ambiguation schemas by some identifier 420 (e.g., determined according to which client hinting engine 230 sent each resource fingerprint 410).

A disambiguation engine 260 can determine a resolved portion 430 of each invoked resource of each resource fingerprint 410 according to the PDRI 305 of the received resource fingerprint 410 and the ambiguation schema identifier 420. As illustrated in FIG. 3, the disambiguation functionality can be a sub-function of the disambiguation engine 260, illustrated as resolver 310. For the sake of simplicity, each resolved portion 430 is shown in FIG. 4 as resolving a single alphanumeric character of an invoked URL string. Two of the received resource fingerprints 410 are shown as originating from the same client hinting engine 230, and have the same PDRI 305 and yield the same resolved portion 430, accordingly. The disambiguation engine 260 and/or an aggregation engine 265 can identify that all the illustrated resource fingerprints 410 invoke the same resource by matching their respective FARIs 303.

At stage 312 of FIG. 3, the aggregation engine 265 can aggregate the resolved portions 430 into an aggregated resolved portion 440. For example, FIG. 3 shows the resolved portion 430a of a received resource fingerprint 410 being aggregated with resolved portions 430b . . . n of previously received matching resource fingerprints 410 (i.e., those resource fingerprints 410 having matching FARIs 303). The resolved portions 430b . . . n of the previously received matching resource fingerprints 410 can be retrieved and/or derived stored blacklisted resources 280 data.

In some embodiments, the aggregated resolved portion 440 can be processed by a function of the aggregation engine 265 (e.g., a whitelister 320 function is shown in FIG. 3, and such a function is shown more generally as 260b in FIG. 4). Embodiments of the whitelister 320 can determine whether the aggregated resolved portion 440 satisfies a disambiguation threshold 313. For example, the disambiguation threshold 313 can identify that enough of the resource has been resolved, that enough of a certain portion of the resource has been resolved (e.g., a domain), that enough PDRI 305 samples have been aggregated for statistical confidence, etc. If the aggregated resolved portion 440 is determined to meet the disambiguation threshold 313, embodiments can indicate the resource as a whitelisted resource 350, which may be stored as part of the whitelisted resources 285. If the aggregated resolved portion 440 is determined not to meet the disambiguation threshold 313, some implementations can add the resource fingerprint 410 to the stored blacklisted resources 285. In other implementations, the whitelister 320 can include one or more disambiguation models 315 (e.g., machine learning models, dictionaries, look-up tables, etc.) for further resolving the resource.

For example, in the illustrated scenario of FIG. 4, the aggregated resolved portion 440 shows "w#w.abcdef.#om" ("#" indicates an unresolved character). While the illustrated aggregated resolved portion 440 suggests that the hinting engine 270 knows which characters are as-yet unresolved, the length of the URL string, etc., this may not be the case in many implementations. For example, such determinations may be made, instead, based on confidence, statistics, etc.; so that the resource is assumed to be resolved to a certain confidence level only after a certain number of PDRIs 305 are received and aggregated (as described above) or at some other point, without making assumptions or having knowledge of properties of the invoked resource. As shown, the disambiguation engine 260 can include certain disambiguation functionality (e.g., the disambiguation models of the whitelister 320) which can be applied to the aggregated resolved portion 440 in an attempt to further resolve the resource. For example, the illustrated embodiment has functionality that assumes that "w#w." will likely be resolved as "www.", and that ".#om" will likely be resolved as ".com". Accordingly, the whitelister function of the disambiguation engine 260 (shown as disambiguation engine 260b) can resolve the remaining portions to yield a fully resolved resource instance 450 as "www.abcdef.com". This fully resolved resource instance 450 can subsequently be reprocessed to determine whether it meets the disambiguation threshold 313; if so, the resource can be indicated as a whitelisted resource 350.

Figure 5:
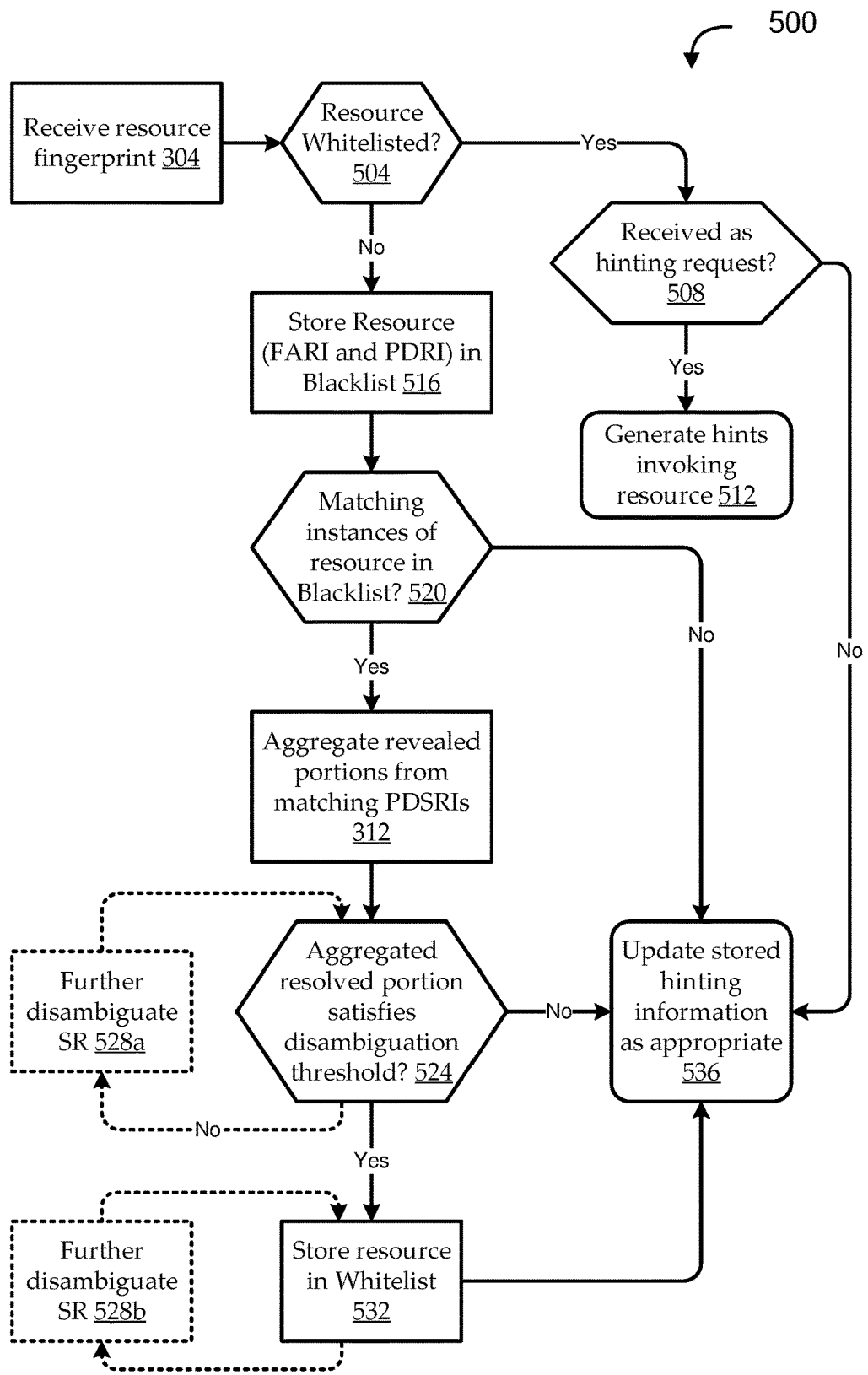
FIG. 5 shows a flow diagram of an illustrative method for privacy-protected hinting generation, according to various embodiments.

FIG. 5 shows a flow diagram of an illustrative method 500 for privacy-protected hinting generation, according to various embodiments. Embodiments of the method 500 begin at stage 304 by receiving resource fingerprints (e.g., as described above with reference to stage 304 of FIG. 3). At stage 504, a determination can be made as to whether the invoked resource is already whitelisted (e.g., by looking up the FARI 303 of the received resource fingerprint 410 in the stored whitelisted resources 285). If so, some embodiments can further determine at stage 508 whether the resource fingerprint was received as a hinting request. If not (e.g., if the resource fingerprint was received as part of hinting feedback), some embodiments can perform any useful hinting functionality not relating to the ambiguation/disambiguation functionality, for example, including updating hinting information as appropriate at stage 536. If the resource is already whitelisted (stage 504), and the indication is received as a hinting request (stage 508), embodiments can generate relevant hints at stage 512 (e.g., hints that invoke the resource).

If the resource is not already whitelisted (stage 504), embodiments can store the resource fingerprint (e.g., the FARI 303 and the PDRI 305) in a blacklist (e.g., in the stored blacklisted resources 280) at stage 516. At stage 520, a determination can be made as to whether the received resource fingerprint matches previously received resource fingerprints (e.g., according to matching the received FARI to previously stored FARIs in the blacklist). If not (i.e., this is likely the first time the resource has been requested), embodiments can end or perform other hinting-related functions, such as updating hinting information as appropriate at stage 536. If the received resource fingerprint matches previously received resource fingerprints, resolved portions of the invoked resource from the matching PDRIs (i.e., the received and previously stored PDRIs) can be aggregated at stage 312 (e.g., as described above with reference to stage 312 of FIG. 3).

At stage 524, embodiments can determine whether the aggregated resolved portion from stage 312 satisfies a disambiguation threshold. If not (i.e., the resource is still considered as private), some embodiments can end or perform other hinting-related functions, such as updating hinting information as appropriate at stage 536. Other embodiments can attempt to further disambiguate the resource at stage 528a (e.g., using a disambiguation model, or the like). If the aggregated resolved portion satisfies the disambiguation threshold (stage 524), embodiments can store the resolved resource in a whitelist (e.g., the stored whitelisted resources 285). In some embodiments, even after the resolved portion is determined to satisfy the disambiguation threshold, further attempts can be made to further disambiguate the resource at stage 528b (e.g., using the same or different techniques from those used in stage 528a). After whitelisting the resource, embodiments can end or perform other hinting-related functions, such as updating hinting information as appropriate at stage 536.

Figure 6:
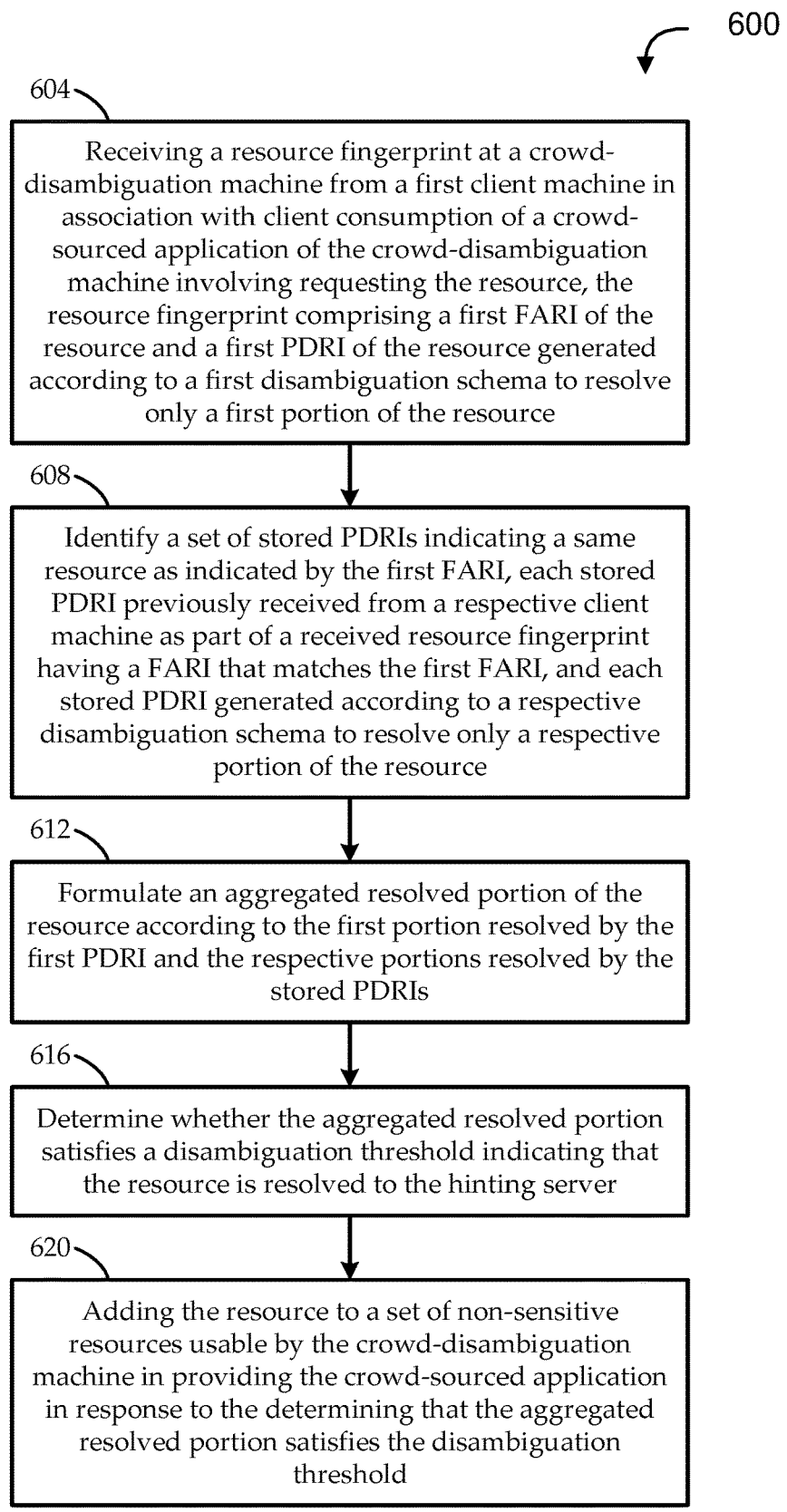
FIG. 6 shows a flow diagram of another illustrative method for crowd-disambiguation of resources, according to various embodiments.

FIG. 6 shows a flow diagram of another illustrative method 600 for privacy-protected hinting generation, according to various embodiments. The method 600 can be a particular iteration of a portion of a larger method, such as the method 500 of FIG. 5. Embodiments of the method 600 begin at stage 604 by receiving a resource fingerprint at a crowd-disambiguation machine from a first client machine in association with client consumption of a crowd-sourced application of the crowd-disambiguation machine involving requesting the resource. For example, the resource fingerprint is received as part of a hinting request, hinting feedback, etc., and can invoke any type of resource for rendering a web page, such as a URL, script, etc. The resource fingerprint has a first fully ambiguated resource instance (FARI) of the resource and a first partially disambiguated resource instance (PDRI) of the resource. As described above, the first FARI can be generated using any suitable ambiguation technique that converts the resource into a sufficiently unique string in a sufficiently deterministic manner (i.e., so that the crowd-disambiguation machine can statistically rely on two identical FARIs received from any client page renderers to be invoking the same resource). Further, as described above, the first PDRI can be generated using any suitable partial disambiguation technique that reveals only a portion of the resource to the crowd-disambiguation machine and leaves the rest ambiguated. For example, a lossy transform can be applied to the resource to ambiguate and/or disambiguate only a portion of the resource. In some implementations, the partial disambiguation technique (e.g., the lossy transform) can be tailored to each of the client page renderers, so that applying the lossy transform to the resource by any one of the client page renderers multiple times resolves a same portion the resource each of the times, and applying the lossy transform to the resource multiple times by different ones of the client page renderers resolves a different portion the resource each of the times. For example, a persistent seed or other technique can be used to ensure that a particular client page render will provide only the same resolved portion of the resource to the crowd-disambiguation machine, regardless of how many times it requests that resource; but that multiple requests for the resource from different client page renderers can yield multiple resolved portions for aggregation.

At stage 608, embodiments can identify (e.g., by the crowd-disambiguation machine), a set of (i.e., one or more) stored PDRIs corresponding to a same resource as indicated by the first FARI. Each stored PDRI is previously received from a respective client machine as part of a received resource fingerprint having a FARI that matches the first FARI (i.e., it invokes the same resource), and each stored PDRI is generated according to a respective disambiguation schema to resolve only a respective portion of the resource. For example, as described above, the previously received resource indicators can be stored as blacklisted resources or in any other suitable manner.

At stage 612, embodiments can formulate (e.g., by the crowd-disambiguation machine) an aggregated resolved portion of the resource according to the first portion resolved by the first PDRI and the respective portions resolved by the stored PDRIs. For example, the some or all of the stored PDRIs reveal different portions of the resource than that of the first PDRI, and those different portions can be aggregated (e.g., as a logical union) to reveal a larger portion (e.g., al) of the resource. At stage 616, embodiments can determine (e.g., by the crowd-disambiguation machine) whether the aggregated resolved portion satisfies a disambiguation threshold indicating that the resource is resolved to the crowd-disambiguation machine. For example, satisfying the disambiguation threshold can indicate that a certain portion (e.g., all) of the resource is resolved with at least a predetermined degree of statistical confidence, that a certain number of different PDRIs has been received and aggregated, etc.

At stage 620, if the aggregated resolved portion satisfies the disambiguation threshold, embodiments can add the resource (e.g., by the crowd-disambiguation machine) to a set of non-sensitive resources usable by the crowd-disambiguation machine in providing the crowd-sourced application. For example, at some subsequent time, a hinting request can be received at the crowd-disambiguation machine (e.g., from the first client page renderer or any other client page renderer), and it can be determined (e.g., according to the FARI) that received hinting request invokes the resource. In response to the request, embodiments of the crowd-disambiguation machine can communicate a page load hinting response that invokes the resource only after the resource has been whitelisted (e.g., at stage 620).

Figure 7B:
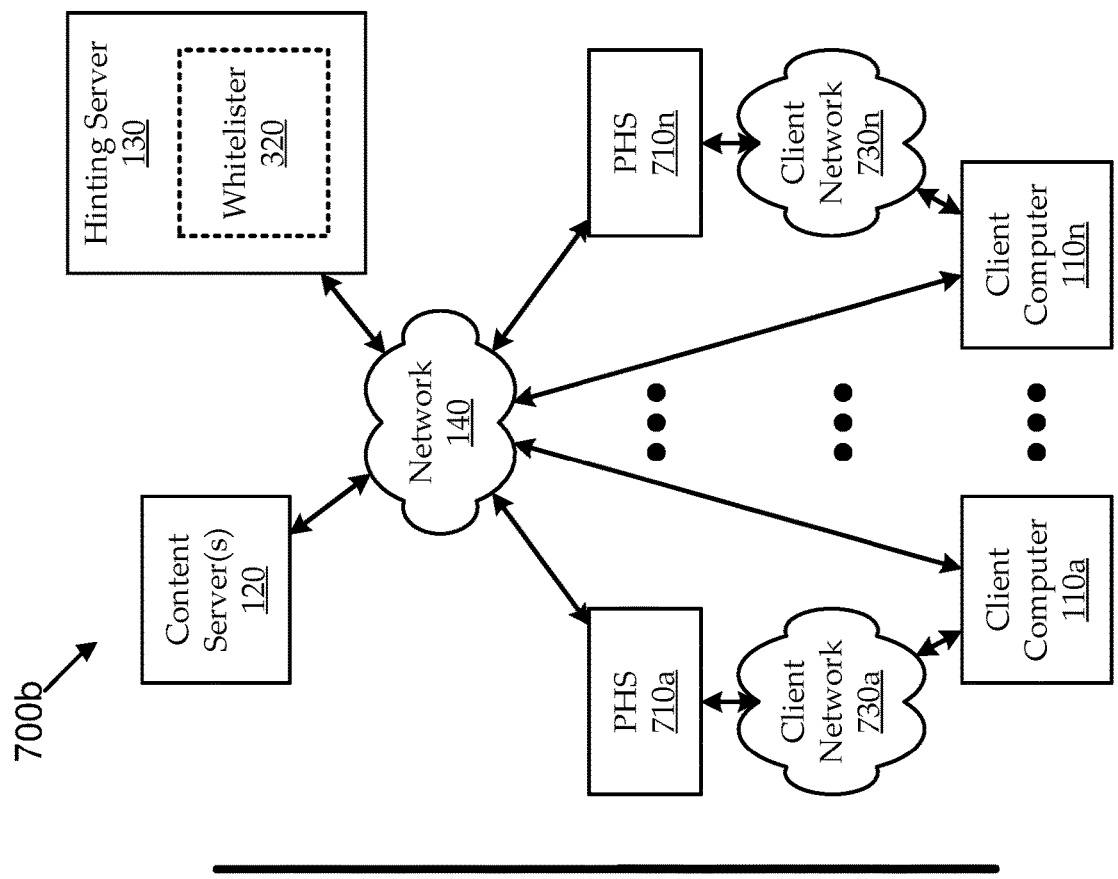
FIGS. 7A and 7B show simplified block diagrams of illustrative communications environments for implementing privacy-protected hint generation using private hinting services, according to various embodiments.
Figure 7A:
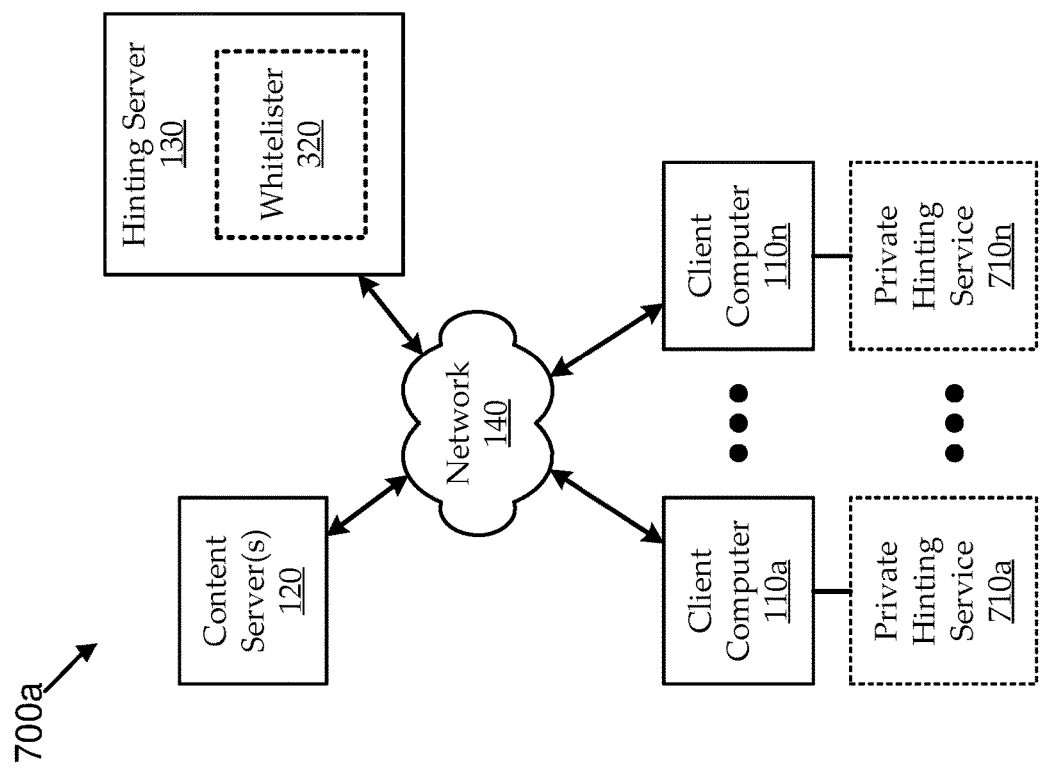

In the above descriptions, some embodiments operate so that a particular resource is either private and permitted for use in hinting, or non-private and not permitted for use in hinting. Some alternative embodiments can use private hinting services for some or all client computers 110 in conjunction with a global crowd-disambiguation machine 130 to provide a level of hinting or similar functionality even for potentially private resources. FIGS. 7A and 7B show simplified block diagrams of illustrative communications environments 700 for implementing privacy-protected hint generation using private hinting services 710, according to various embodiments. As in FIGS. 1 and 2 above, the communications environments 700 include client computers 110, one or more crowd-disambiguation machines 130, and one or more content servers 120, some or all of which being in communication with each other via one or more networks 140. Further, as illustrated, each client computer 110 can be associated with a respective private hinting service 710 that provides private hinting functionality, and the crowd-disambiguation machine(s) 130 can include a whitelister 320 that can coordinate the private hinting with non-private (e.g., global) hinting functionality. Embodiments can be implemented with various architectures to effectuate private-public hinting functionality. One such architecture, illustrated in FIG. 7A, implements each private hinting service 710 as a functional block of its associated client computer 110. For example, the private hinting service 710 can be implemented as part of the client hinting engine 230 described with reference to FIG. 2. Another such architecture, illustrated in FIG. 7B, implements each private hinting service 710 as a separate component (e.g., a separate server, device, application, etc.) in communication with its associated client computer 110 over a respective client network 730. For example, each client network 730 can be implemented as a local area network (e.g., a LAN or VLAN), a secure tunnel to a network (e.g., a VPN), a credential-based connection, and/or any suitable network for providing the desired level of security for potentially private resources.

As with other embodiments described herein, embodiments of private-public hinting can operate on hinting indications received from client computers 110, and embodiments can consider each (some or all) of the invoked resources a priori as private (i.e., private until shown to be non-private). When a client computer 110 generates a resource fingerprint (e.g., as part of a hinting request, hinting feedback, etc.), the resource fingerprint can be handled by the private hinting service 710 and/or by the crowd-disambiguation machine 130, depending on whether the invoked resource is considered as private (e.g., presently blacklisted, not whitelisted, etc.). For example, while the invoked resource is considered as private, the private hinting service 710 can perform client-specific hinting functions, such as performing and/or optimizing prefetching of the resource and/or related resources, handling client hinting requests with client-tailored hinting responses, gathering local hinting feedback information, etc. These client-specific hinting functions can be performed without causing potentially private resource information to be communicated to other client computers 110 (e.g., by staying within a client-centric hinting environment).

As client-specific hinting functions are being performed by the private hinting services 710, information can concurrently be gathered by the crowd-disambiguation machine 130 to determine whether to whitelist invoked resources. Some implementations use techniques described above to communicate resource fingerprints to the crowd-disambiguation machine with FARIs and PDRIs. For example, each time a potentially private resource fingerprint is processed by a private hinting service 710, a resource fingerprint is also communicated (e.g., by the private hinting service 710 or any suitable function of the client computer 110) to the crowd-disambiguation machine with a FARI and PDRI of the invoked, potentially private resource. Other implementations can send only a FARI or other ambiguated instance of the resource to the crowd-disambiguation machine 130. In these and/or other implementations, the whitelister 320 of the crowd-disambiguation machine 130 can monitor invoked resources to determine whether to promote them to public resources (e.g., whether to whitelist them). Some embodiments of the whitelister 320 are implemented as described above with reference to FIG. 3. For example, the whitelister 320 can determine whether the invoked resource has met a promotion threshold. In one implementation, the whitelister 320 can maintain a count of the number of received instances of the resource (or its associated FARI, etc.) from different client computers 110, and the promotion threshold is met when the count exceeds a certain predefined number (e.g., over all time, over a particular timeframe, etc.). In another implementation, the whitelister 320 can configure a disambiguation threshold, as described above, to determine whether the invoked resource is sufficiently resolved to be considered as non-private.

When the invoked resource is no longer private, it can be handled by the crowd-disambiguation machine 130 as a non-private (e.g., whitelisted) resource, and can be included in global hinting functionality across users. In some implementations, the private hinting service 710 can continue to provide certain types of functionality, such as communicating its client-specific hinting feedback information to the crowd-disambiguation machine 130 (e.g., in implementations where the crowd-disambiguation machine 130 does not gather, or does not have access to, the same feedback information while the resource is considered private), informing the crowd-disambiguation machine 130 (or confirming to the crowd-disambiguation machine 130) of the identity of the resource (e.g., where only the ambiguated instances are sent while the resource is considered private), etc.

While each private hinting service 710 illustrated as being associated with a single client computer 110, some implementations can associate a private hinting service 710 with a group of client computers 110. For example, in an office environment, or the like, all the client computers 110 in a particular LAN, behind a particular firewall or network address translator (NAT), etc. can be treated effectively as a single hinting user and associated with a single private hinting service 710 (e.g., or any suitable number of private hinting services 710). Alternatively, some implementations can associate multiple private hinting services 710 with a single client computer 110. For example, where a single client computer 110 has multiple users (e.g., multiple user profiles, logins, etc.), each user (or user type, collection of users, etc.) can be associated with its own private hinting service 710.

The above descriptions focus on embodiments in which a resource fingerprint includes both a FARI and a PDRI. Other categories of embodiments can rely on different types of approaches. One such category provides hinting functionality with limited privacy sensitivity without using ambiguation. As described above, one potential concern with some hinting approaches is that resource information coming from a first client computer 110 can be sent to a second client computer 110 as part of hints, and that resource information potentially includes private information of the first client computer 110. Embodiments described above generally ambiguate the resource identity both to those other client computers 110 and to the crowd-disambiguation machine 130 until the resource is determined to be non-private. However, certain alternative embodiments can allow the crowd-disambiguation machine 130 access to the identity of the resource, while avoiding sending potentially private resources to other client computer 110. According to such embodiments, the crowd-disambiguation machine 130 can receive revealed instances of resources (i.e., the crowd-disambiguation machine 130 is aware of the identity of the resource) as resource fingerprints that are part of hinting requests, hinting feedback, etc. As the resource fingerprints are received, the crowd-disambiguation machine 130 can maintain information on how often particular resources are requested, for example as a count of requests for a particular resource, a count of requests for related resources (e.g., resources sharing a common domain or other characteristic), request trends and/or statistics for a particular resource, etc. A threshold can be set for resource requests, so that meeting the threshold indicates the resource should be treated as non-private. For example, whenever a resource is indicated by ten different client computers 110 (e.g., ever, within a particular timeframe, etc.), it can be whitelisted as non-private. When the threshold is unmet, the resource is considered private and is not included in any hints (e.g., or at least in any hints provided to client computers 110 who have never indicated that resource); and once the threshold is met, the resource can be considered as non-private and can be included in subsequent hints (e.g., to any client computer 110).

Figure 8:
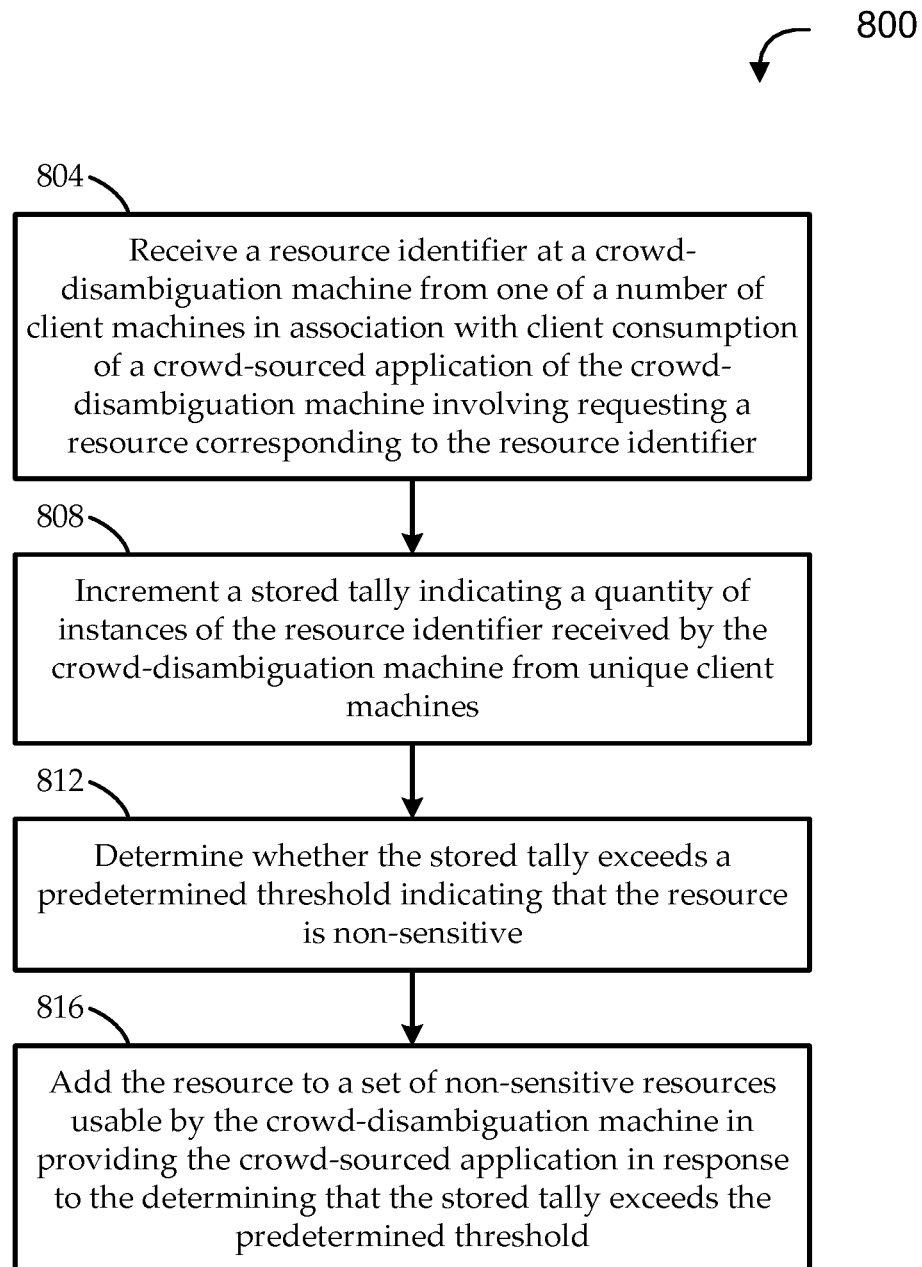
FIG. 8 shows a flow diagram of another illustrative method for crowd-disambiguation of resources, according to various embodiments.

Some embodiments of such an approach are illustrated in FIG. 8, which shows a flow diagram of an illustrative method 800 for crowd-based disambiguation of potentially private data resources in a communications network. Embodiments of the method 800 begin at stage 804 by receiving a resource identifier at a crowd-disambiguation machine from one of a number of client machines in association with client consumption of a crowd-sourced application of the crowd-disambiguation machine involving requesting a resource corresponding to the resource identifier. At stage 808, a stored tally can be incremented. The tally can indicate a quantity of instances of the resource identifier received by the crowd-disambiguation machine from unique client machines (e.g., unique votes). Embodiments can determine, at stage 812, whether the stored tally exceeds a predetermined threshold indicating that the resource is non-sensitive. At stage 816, the resource can be added to a set of non-sensitive resources usable by the crowd-disambiguation machine in providing the crowd-sourced application in response to the determining that the stored tally exceeds the predetermined threshold (at stage 812).

The method of FIG. 8 can be implemented by a system, such as the ones described with reference to FIGS. 1 and 2. Such a system can include means for receiving a resource identifier at a crowd-disambiguation machine from one of a plurality of client machines in association with client consumption of a crowd-sourced application of the crowd-disambiguation machine involving requesting a resource corresponding to the resource identifier. For example, the resource identifier can be received by a communications engine of a server machine, or any other suitable machine that communicated with client machines over a communications network. The means for receiving can include any suitable hardware (e.g., and supporting software) for communicating over a network, such as antennas, physical and/or logical ports, protocols, modems, routers, etc. In some embodiments, the means for receiving can receive the resource identifiers as fully disambiguated (e.g., plaintext, etc.). In other embodiments, the means for receiving can receive the resource identifier at the crowd-disambiguation machine as a resource fingerprint made up of a first fully ambiguated resource instance (FARI) of the resource and a first partially disambiguated resource instance (PDRI) of the resource.

Such systems can further include means for incrementing a stored tally indicating a quantity of instances of the resource identifier received by the crowd-disambiguation machine from unique client machines. For example, one or more tangible storage devices, including any suitable form of computer-readable storage media, can be used to maintain the tally and/or the resource indications themselves. Further, the means for incrementing can include hardware and/or software for identifying matching resource identifiers (e.g., as similar or identical to other stored identifiers), and accumulating and maintaining the count of those identifiers. In embodiments where the resource identifier is received as a resource fingerprint, the means for incrementing can include means for identifying a set of stored PDRIs corresponding to a same resource as indicated by the first FARI. In such embodiments, each stored PDRI can be previously received from a respective client machine as part of a received resource fingerprint having a FARI that matches the first FARI, and each stored PDRI can be generated according to a respective disambiguation schema to resolve only a respective portion of the resource.

Such systems can further include means for determining, by the crowd-disambiguation machine, whether the stored tally exceeds a predetermined threshold indicating that the resource is non-sensitive. For example, such means can monitor the stored resource identifiers to determine whether a certain threshold number has been received, whether some or all of the resource is resolvable, etc. In embodiments where the resource identifier is received as a resource fingerprint, the means for determining can include means for formulating an aggregated resolved portion of the resource according to the first portion resolved by the first PDRI and the respective portions resolved by the stored PDRIs; and means for determining whether the aggregated resolved portion satisfies a disambiguation threshold indicating that the resource is resolved to the crowd-disambiguation machine. For example, as described herein, the means can include statistical processors that compute whether a resource has become resolvable to a predetermined level of statistical confidence.

Further, such systems can include means for adding the resource, by the crowd-disambiguation machine, to a set of non-sensitive resources usable by the crowd-disambiguation machine in providing the crowd-sourced application in response to the determining that the stored tally exceeds the predetermined threshold. For example, such means can include a storage manager that assigns (e.g., stores) each resource (e.g., each unique resource identifier) to a particular storage medium or set of storage resources associated with non-sensitive, or as-yet-sensitive resources, in accordance with the means for adding.

Another such category of embodiments includes only the FARI in the resource fingerprint. As described above, client computers 110 can communicate the resource fingerprints in various contexts, including, for example, as part of hinting requests, hinting feedback, etc. In such embodiments, when resource fingerprints are sent (e.g., or only for those resources not already whitelisted), the crowd-disambiguation machine 130 effectively receives a "vote" for the FARI without necessarily knowing the identity of the underlying resource. Once a threshold number of votes is received (e.g., similar to the disambiguation threshold described above), the FARI can be considered as representing a non-private resource. Embodiments can then determine the identity of the underlying resource by explicit request. For example, the crowd-disambiguation machine 130 can send a request to the client computer 110 that originated the most recent resource fingerprint having that FARI, requesting a fully disambiguated instance of the resource.

Some embodiments can be a hybrid of the preceding approach and the approach discussed, for example, with reference to FIGS. 3-6. For example, the resource fingerprint can include both the FARI and the PDRI. After some number of resource fingerprints is received from different client computers 110, the crowd-disambiguation machine 130 can send a request to the client computer 110 that originated the most recent resource fingerprint having that FARI, requesting a fully disambiguated instance of the resource. This can provide a number of features. One feature of such an approach is that the number of received PDRIs (e.g., "k" above) can be more precisely tuned, so that, even if the resource is not resolved after a certain number PDRIs is received, the resource can still be resolved more explicitly. Another feature of such an approach is that, prior to whitelisting the resource, the crowd-disambiguation machine 130 can send one or more client computers 110 what it has resolved thusfar, and the client computer(s) 110 can confirm whether the resolved resource matches the requested resource. This can help increase the confidence level of the whitelist, help improve machine learning models, etc.

Another category of approaches exploits partial resolution of resources to provide more hints sooner, while maintaining privacy sensitivity. Embodiments can whitelist a defined set of common portions of resources as non-private. In some instances, the common portions can be predefined from common resource patterns. For example, a typical URL can follow a known pattern, such as "p://x.y.z/a," where "p" is a common protocol identifier (e.g., "http," "https," "ftp," etc.), "x" is a common sub-domain identifier (e.g., "www"), "z" is a common top-level domain identifier (e.g., "com," "net," "org," etc.), so that "p," "x," and "z" are highly unlikely to be private to the user; and only "y" (the domain identifier) and "a" (a file path identifier, or the like) have potentially private information. As such, the whitelist can include predefined sets of common protocols, top-level domains, sub-domains, resource string patterns, etc. Additionally or alternatively, some implementations can add to the list and/or update the list as resources are received and disambiguated using approaches described above. In some implementations, the client hinting engine 230 (e.g., resource ambiguation engine 235) can be directed to always communicate those whitelisted portions of resources in a disambiguated manner. For example, the disambiguation schema can operate only on the non-whitelisted portions of a resource. Such an approach can be particularly useful for example, with resolving dynamically generated URLs having a combination of common and dynamic portions, with commonly requested domains that tend to use long file path identifiers, etc. For example, long resources may be resolved more quickly if portions of the resource are effectively "pre-resolved" as common, non-private information.

In some embodiments, as resources are received and partially and/or fully resolved (e.g., according to the techniques described above), more common portions of a resource (or a group of related resources, such as all sub-resources from the same domain) may resolve sooner than less common portions. For example, the "[sub-domain]. [domain] [top-level domain]" portion of a URL may resolve relatively quickly, as compared to the file path identifier portion of a URL, due to root domains (e.g., main pages of a web site) being requested more often and/or where the FARIs and PDRIs are generated per resource portion (e.g., if a cryptographic hash is applied to an entire URL string, it may not be usable for identifying multiple URLs as having a common domain, etc.). Accordingly, some embodiments can identify instances when a domain, or other useful portion of a resource, has been resolved, and can exploit that partial resolution. For example, a particular domain may tend to have web pages with a common look and feel, so that rendering of most web pages associated with that domain can benefit from hints associated with the domain. Notably, some of the techniques exploiting partial disambiguation, dynamic resources, etc. can involve tailoring of the PDRI generation. For example, the lossy transform used by certain implementations can be constructed to account for variable lengths of dynamic portions of a resource string.

Certain implementations exploit similar or identical information to that of the partial resolution exploitation embodiments, but for a different and/or additional purpose. As described above, certain approaches can considered a resource to be resolved when it meets a particular threshold, or the like; so that there may be (or, in some implementations, there is always) some statistical uncertainty as to the resolution of the resource. Tracking certain portions of resources as more or less common, etc. can provide a further factor for increasing or decreasing the confidence in the resolution. For example, if attempted resolution of a long resource string barely falls short of meeting the disambiguation threshold for whitelisting, but the resolution indicates that the resource matches one known to be relatively common, the disambiguation threshold may be considered as satisfied (e.g., the threshold is effectively moved so that the resolved resource meets the threshold where it may not have otherwise).

Another category of approaches can also exploit similar or identical information to that of the partial resolution exploitation embodiments. As described above, various techniques can identify resolved portions of a resource. For example, some implementations can facilitate portions of a resource to be independently (or more quickly, etc.) resolved. Other implementations can parse fully resolved resources to identify component parts. Using these and/or other techniques, some embodiments can generate and/or maintain statistics, or the like, relating to the apparent popularity of certain portions of resources. For example, analyzing resource requests across large numbers of web pages and large numbers of users can reveal which resources appear to be generated dynamically to include search information (e.g., query strings, etc.), user information (e.g., account information, user name, etc.), changing file paths (e.g., an image or story that changes each time a page is loaded), "cache-busting" information (e.g., random strings, strings encoding timestamps or other information, etc.), and/or any other types of dynamic portions. By identifying portions of resources as apparently dynamic, masking of resources can be applied dynamically to those portions. For example, URL masking can be used to improve hinting (e.g., by allowing hints to be sent at the domain level, or the like, without waiting for full resolution of the URLs), to circumvent certain cache busting approaches, to maintain more reliable user behavior data (e.g., browsing statistics, trends, etc., which can be used to inform prefetching, pre-positioning, advertisement targeting, and/or many other functions), etc.

Figure 9:
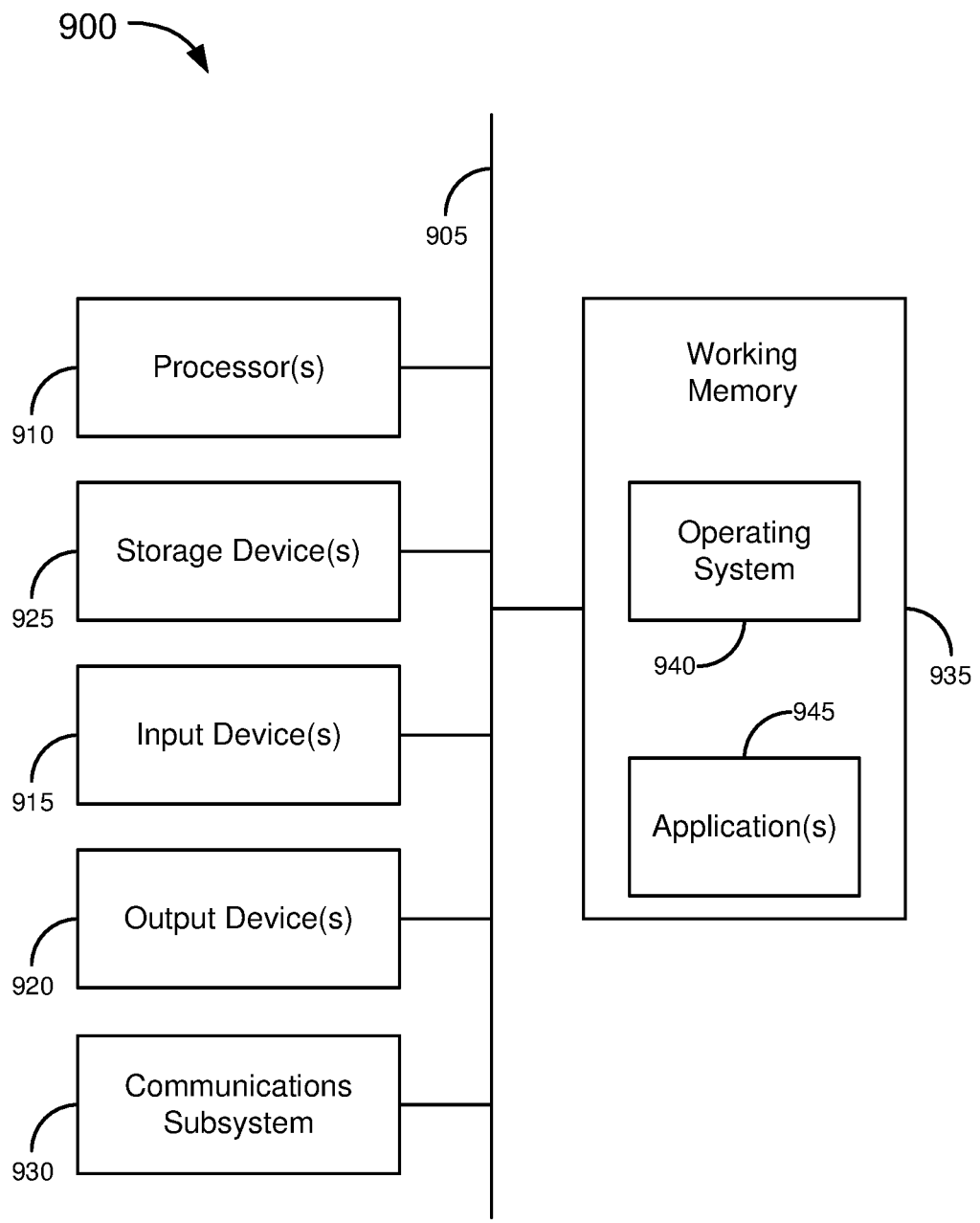
FIG. 9 provides a schematic illustration of one embodiment of a computer system that can perform the methods of the invention, as described herein, and/or can function, for example, as any part of client computer(s), content server(s), crowd-disambiguation machine(s) 130 or any other such computer or device.

FIG. 9 provides a schematic illustration of one embodiment of a computer system 900 that can perform the methods of the invention, as described herein, and/or can function, for example, as any part of client computer(s) 110, content server(s) 120, crowd-disambiguation machine(s) 130, or any other such computer or device. It should be noted that FIG. 9 is meant only to provide a generalized illustration of various components, any or all of which may be utilized, as appropriate. FIG. 9 therefore broadly illustrates how individual system elements may be implemented in a relatively separated or relatively more integrated manner.

The computer system 900 is shown comprising hardware elements that can be electrically coupled via a bus 905 (or may otherwise be in communication, as appropriate). The hardware elements can include one or more processors 910, including, without limitation, one or more general-purpose processors and/or one or more special-purpose processors (such as digital signal processing chips, graphics acceleration chips, and/or the like); one or more input devices 915, which can include, without limitation, a mouse, a keyboard, touchscreen, and/or the like; and one or more output devices 920, which can include, without limitation, a display device, a printer, and/or the like.

The computer system 900 may further include (and/or be in communication with) one or more storage devices 925, which can comprise, without limitation, local and/or network accessible storage and/or can include, without limitation, a disk drive, a drive array, an optical storage device, a solid-state storage device such as a random access memory ("RAM") and/or a read-only memory ("ROM"), which can be programmable, flash-updateable, and/or the like. The computer system 900 might also include a communications subsystem 930, which can include, without limitation, a modem, a network card (wireless or wired), an infrared communication device, a wireless communication device, and/or chipset (such as an 802.11 device, a WiFi device, a WiMax device, cellular communication facilities, etc.), and/or the like. The communications subsystem 930 may permit data to be exchanged with a network (such as the network described below, to name one example), and/or any other devices described herein. In many embodiments, the computer system 900 will further comprise a working memory 935, which can include a RAM or ROM device, as described above.

The computer system 900 also can comprise software elements, shown as being currently located within the working memory 935, including an operating system 940 and/or other code, such as one or more applications 945, which may comprise computer programs of the invention and/or may be designed to implement methods of the invention and/or configure systems of the invention, as described herein. Merely by way of example, one or more procedures described with respect to the method(s) discussed above might be implemented as code and/or instructions executable by a computer (and/or a processor within a computer). A set of these instructions and/or code might be stored on a computer-readable storage medium, such as the storage device(s) 925 described above. In some cases, the storage medium might be incorporated within a computer system, such as the system 900. In other embodiments, the storage medium might be separate from a computer system (i.e., a removable medium, such as a compact disc, etc.), and/or provided in an installation package, such that the storage medium can be used to program a general-purpose computer with the instructions/code stored thereon. These instructions might take the form of executable code, which is executable by the computer system 900, and/or might take the form of source and/or installable code which, upon compilation and/or installation on the computer system 900 (e.g., using any of a variety of generally available compilers, installation programs, compression/decompression utilities, etc.), then takes the form of executable code. In certain embodiments, this may include page renderer functionality and may include separate page renderer modules as part of this page renderer functionality executed by a process to enable display of a web page on an output device 920 of such a computer system 900.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

In one aspect, the invention employs a computer system (such as the computer system 900) to perform methods of the invention. According to a set of embodiments, some or all of the procedures of such methods are performed by the computer system 900 in response to processor 910 executing one or more sequences of one or more instructions (which might be incorporated into the operating system 940 and/or other code, such as an application 945) contained in the working memory 935. Such instructions may be read into the working memory 935 from another machine-readable medium, such as one or more of the storage device(s) 925. Merely by way of example, execution of the sequences of instructions contained in the working memory 935 might cause the processor(s) 910 to perform one or more procedures of the methods described herein.

The terms "machine-readable medium" and "computer-readable medium", as used herein, refer to any medium that participates in providing data that causes a machine to operate in a specific fashion. In an embodiment implemented using the computer system 900, various machine-readable media might be involved in providing instructions/code to processor(s) 910 for execution and/or might be used to store and/or carry such instructions/code (e.g., as signals). In many implementations, a computer-readable medium is a physical and/or tangible storage medium. Such a medium may take many forms including, but not limited to, non-volatile media. Non-volatile media includes, for example, optical or magnetic disks, such as the storage device(s) 925. Common forms of physical and/or tangible computer-readable media include, for example, a flexible disk, hard disk, magnetic tape or any other magnetic medium, a CD-ROM or any other optical medium, solid-state circuit based memory or any other memory chip or cartridge, or any other medium from which a computer can read instructions and/or code. Various forms of machine-readable media may be involved in carrying one or more sequences of one or more instructions to the processor(s) 910 for execution. Merely by way of example, the instructions may initially be carried on a memory of a remote computer. A remote computer might load the instructions into its dynamic memory and send the instructions as signals over a transmission medium to be received and/or executed by the computer system 900.

The communications subsystem 930 (and/or components thereof) generally will receive the signals, and the bus 905 might then carry the signals (and/or the data, instructions, etc., carried by the signals) to the working memory 935, from which the processor(s) 910 retrieves and executes the instructions. The instructions received by the working memory 935 may optionally be stored on a storage device 925 either before or after execution by the processor(s) 910.

Figure 10:
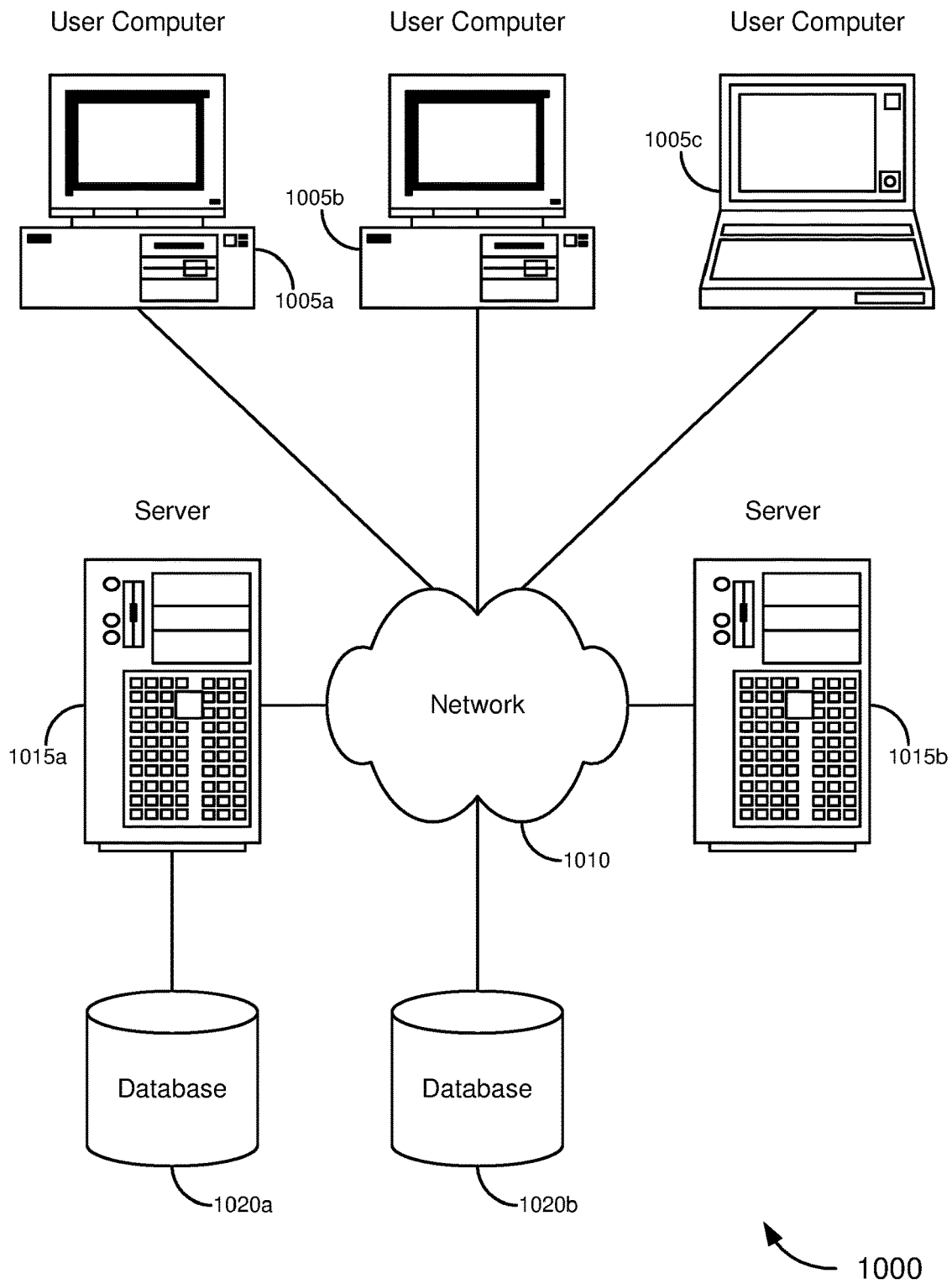
FIG. 10 illustrates a schematic diagram of a network system that can be used in accordance with one set of embodiments.

A set of embodiments includes systems for implementing improved web page rendering and improved network resource usage based, for example, on the creation and use of sets of hints from embedded feedback scripts and/or the like. FIG. 10 illustrates a schematic diagram of a network system 1000 that can be used in accordance with one set of embodiments. In such embodiments, the network system 1000 may represent any number of client and server devices that enable content to be communicated from content providers to user systems as part of web page transactions across a network. The system 1000 can include one or more user computers 1005, such as computers for implementing client computer(s) 110 of FIG. 1. The user computers 1005 can be general-purpose personal computers and/or can have any of a variety of applications, including one or more applications configured to perform methods of the invention, as well as one or more office applications, database client and/or server applications, and page renderer applications. Alternatively, the user computers 1005 can be any other electronic device, such as a thin-client computer, Internet-enabled mobile telephone, tablet computer, phablet, wearable device, Internet-enabled appliance, and/or personal digital assistant (PDA) capable of communicating via a network (e.g., the network 1010 described below) and/or displaying and navigating web pages or other types of electronic documents. Although the exemplary system 1000 is shown with three user computers 1005a-c, any number of user computers can be supported.

Certain embodiments of the invention operate in a networked environment, which can include a network 1010, such as for implementing the network 140 of FIG. 1. The network 1010 can be any type of network familiar to those skilled in the art that can support data communications using any of a variety of commercially-available protocols, including, without limitation, TCP/IP, UDP/IP, SNA, IPX, and the like. Merely by way of example, the network 1010 can be a local area network ("LAN"), including, without limitation, an Ethernet network, a Token-Ring network and/or the like; a wide-area network (WAN); a virtual network, including, without limitation, a virtual private network ("VPN"); the Internet; an intranet; an extranet; a public switched telephone network ("PSTN"); an infrared network; a wireless network, including, without limitation, a network operating under any of the IEEE 802.11 suite of protocols, or any other wireless protocol; and/or any combination of these and/or other networks.

Embodiments of the invention can include one or more servers 1015 (or similar types of computational systems). Embodiments of the servers 1015 can be used to implement the content server(s) 120 and/or the crowd-disambiguation machine(s) 130. As described above, the crowd-disambiguation machine(s) 130 can also be part of one or more content servers 120, which can be implemented as one or more of the servers 1015. Each of the servers 1015 may be configured with an operating system, including, without limitation, any of those discussed above, as well as any commercially (or freely) available server operating systems. Each of the servers 1015 may also be running one or more applications, which can be configured to provide services to one or more user computers 1005 and/or other servers 1015.

Merely by way of example, one of the servers 1015 may be a web server, which can be used, merely by way of example, to process requests for web pages or other electronic documents from user computers 1005. The web server can also run a variety of server applications, including HTTP servers, FTP servers, CGI servers, database servers, script servers, and the like. In some embodiments of the invention, the web server may be configured to serve web pages that can be operated within a page renderer on one or more of the user computers 1005 to perform methods of the invention. In certain embodiments, the servers 1015 may also include CDN devices which provide similar or identical content from an alternate server than the primary content server which is a source for particular objects in a web page transaction.

The servers 1015, in some embodiments, might include one or more application servers, which can include one or more applications accessible by a client running on one or more of the user computers 1005 and/or other servers 1015. Merely by way of example, the server(s) 1015 can be one or more general-purpose computers capable of executing programs or scripts in response to the user computers 1005 and/or other servers 1015, including, without limitation, web applications (which might, in some cases, be configured to perform methods of the invention). Merely by way of example, a web application can be implemented as one or more scripts or programs written in any suitable programming language. The application server(s) can also include database servers which can process requests from clients (including, depending on the configurator, database clients, API clients, page renderers, etc.) running on a user computer 1005 and/or another server 1015. In some embodiments, an application server can create web pages dynamically for displaying the information in accordance with embodiments of the invention, such as information displayed as part of various page renderers discussed herein. Data provided by an application server may be formatted as web pages (e.g., comprising HTML, scripts, etc.) and/or may be forwarded to a user computer 1005 via a content server 120. Similarly, a content server 120 can receive web page requests and/or input data from a user computer 1005 and/or forward the web page requests and/or input data to an application server. In some cases, a content server 120 may be integrated with an application server.

In accordance with further embodiments, one or more servers 1015 can function as a file server and/or can include one or more of the files (e.g., application code, data files, etc.) necessary to implement methods of the invention incorporated by an application running on a user computer 1005 and/or another server 1015. Alternatively, as those skilled in the art will appreciate, a file server can include all necessary files, allowing such an application to be invoked remotely by a user computer 1005 and/or server 1015. It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 1020, such as for storing hinting information 135, blacklisted resources 280, whitelisted resources 285, web pages 125, resources 127, and/or any other suitable data used by systems and methods of various embodiments. Such databases may include stores of web transaction history and hints derived from this web transaction history. Any supporting details related to creation of such hints may additionally be stored in such a database. The location of the database(s) 1020 is discretionary: merely by way of example, a database 1020a might reside on a storage medium local to (and/or resident in) a server 1015a (and/or a user computer 1005). Alternatively, a database 1020b can be remote from any or all of the computers 1005 or servers 1015a,b, so long as the database 1020b can be in communication with one or more of these (e.g., via the network 1010). In a particular set of embodiments, a database 1020 can reside in a storage-area network ("SAN") familiar to those skilled in the art. Likewise, any necessary files for performing the functions attributed to the computers 1005 or servers 1015 can be stored locally on the respective computer and/or remotely, as appropriate. In one set of embodiments, the database 1020 can be a relational database that is adapted to store, update, and retrieve data in response to SQL-formatted commands. The database might be controlled and/or maintained by a database server, as described above, for example.

In any embodiment described herein, any communication, hypertext transport protocol (HTTP) request or response, web page transaction, portion of a web page transaction, or any combination of any communications in whole or in part that may use HTTP may also be implemented using hypertext transport protocol secure (HTTPS). The use of HTTPS involves encryption and various security measures, and any embodiment described herein may be adapted to implement systems and methods described herein to accommodate the encryption and security associated with HTTPS in a number of ways.

In certain embodiments, proxy devices involved in any communication described herein may be provided with details associated with HTTPS communications in order to enable any proxy device functionality described herein. Such details may be provided by a user device with user consent to enable proxy device or crowd-disambiguation machine device interaction with the user's communications. This may enable decryption of HTTPS communication by the proxy to enable any functionality described herein. Such details to enable decryption may also be provided by a content server or content server operator to enable proxy device interaction with the content provider's communications. For aspects of embodiments described herein relating to client-side functionality or page renderer functionality, certain embodiments may function with the same implementation described above for proxy devices. This functionality may be used as well with any other server side or content device.

In other embodiments, rather than a proxy decryption of HTTPS communications, a browser on a user device may interact with a proxy device or a crowd-disambiguation machine device, independent of the original HTTPS communication to provide details of the HTTPS communication to the proxy device or crowd-disambiguation machine device. In a user device page renderer, this may involve the use of a page renderer module, page renderer plug-in, or page renderer with specialized core functionality to observe HTTPS communications before they are encrypted. If needed, the independent communications with the proxy device or crowd-disambiguation machine device may then additionally be subject to security similar to the security used for the original HTTPS communication. For embodiments described herein which may involve integration with content provider systems or reverse proxy systems, HTTPS communication received at the content provider system or reverse proxy may be used as part of the embodiments described herein after the HTTPS communication is decrypted by the content provider system or reverse proxy. Thus, any "observing" or "identifying" functionality described herein may be performed with HTTPS communications for client computers, proxy devices, and content provider devices. Similarly, any embodiment described herein may be implemented with other secure connection and communication systems or protocols in addition to HTTPS described above.

Certain embodiments described herein refer to proxy devices or proxy systems. As described herein, proxy devices may be one or more devices operating as part of a system to intercept communications between user devices and content devices. Such proxies may be transparent to the user and content devices, or may be part of a multi-step communication path which is apparent to user and content devices. In certain embodiments, proxy devices may function as part of a forward proxy system, where communications from a group of user devices are all communicated to a broader network (such as the Internet) via the forward proxy system. In alternate embodiments, the proxy devices may function as part of reverse proxy systems, where a reverse proxy system operates as an access path to a number of content server devices. It will be apparent that embodiments described herein as including a proxy will apply to both forward proxy systems and reverse proxy systems, and any configuration of a system including a proxy, given appropriate accommodations for the particular system structure.

The methods disclosed herein include one or more actions for achieving the described method. The method and/or actions can be interchanged with one another without departing from the scope of the claims. In other words, unless a specific order of actions is specified, the order and/or use of specific actions can be modified without departing from the scope of the claims.

The functions described can be implemented in hardware, software, firmware, or any combination thereof. If implemented in software, the functions can be stored as one or more instructions on a tangible computer-readable medium. A storage medium can be any available tangible medium that can be accessed by a computer. By way of example, and not limitation, such computer-readable media can include RAM, ROM, EEPROM, CD-ROM, or other optical disk storage, magnetic disk storage, or other magnetic storage devices, or any other tangible medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

A computer program product can perform certain operations presented herein. For example, such a computer program product can be a computer readable tangible medium having instructions tangibly stored (and/or encoded) thereon, the instructions being executable by one or more processors to perform the operations described herein. The computer program product can include packaging material.

Software or instructions can also be transmitted over a transmission medium. For example, software can be transmitted from a website, server, or other remote source using a transmission medium such as a coaxial cable, fiber optic cable, twisted pair, digital subscriber line (DSL), or wireless technology such as infrared, radio, or microwave.

Further, modules and/or other appropriate means for performing the methods and techniques described herein can be downloaded and/or otherwise obtained by suitable terminals and/or coupled to servers, or the like, to facilitate the transfer of means for performing the methods described herein. Alternatively, various methods described herein can be provided via storage means (e.g., RAM, ROM, a physical storage medium such as a CD or floppy disk, etc.), such that a user terminal and/or base station can obtain the various methods upon coupling or providing the storage means to the device. Moreover, any other suitable technique for providing the methods and techniques described herein to a device can be utilized. Features implementing functions can also be physically located at various positions, including being distributed such that portions of functions are implemented at different physical locations.

In describing the present invention, the following terminology will be used: The singular forms "a," "an," and "the" include plural referents unless the context clearly dictates otherwise. Thus, for example, reference to an item includes reference to one or more items. The terms "one" or "ones" refers to one, two, or more, and generally applies to the selection of some or all of a quantity. The term "plurality" refers to two or more of an item. The term "about" means quantities, dimensions, sizes, formulations, parameters, shapes and other characteristics need not be exact, but can be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations including, for example, tolerances, measurement error, measurement accuracy limitations and other factors known to those of skill in the art, can occur in amounts that do not preclude the effect the characteristic was intended to provide. Numerical data can be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but also include individual values and sub-ranges within the indicated range. Thus, included in this numerical range are individual values such as 2, 3 and 4 and sub-ranges such as 1-3, 2-4 and 3-5, etc. This same principle applies to ranges reciting only one numerical value (e.g., "greater than about 1") and should apply regardless of the breadth of the range or the characteristics being described. A plurality of items can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items can be used alone or in combination with other listed items. The term "alternatively" refers to selection of one of two or more alternatives, and is not intended to limit the selection to only those listed alternatives or to only one of the listed alternatives at a time, unless the context clearly indicates otherwise. The term "coupled" as used herein does not require that the components be directly connected to each other. Instead, the term is intended to also include configurations with indirect connections where one or more other components can be included between coupled components. For example, such other components can include amplifiers, attenuators, isolators, directional couplers, redundancy switches, and the like. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples. Similarly, terms, such as "optimize" are not intended to limit embodiments to an optimal approach or result, but rather to express seeking movement toward an optimal result (e.g., to improve, etc.). As used herein, a "set" of elements is intended to mean "one or more" of those elements, except where the set is explicitly required to have more than one or explicitly permitted to be a null set.

Various changes, substitutions, and alterations to the techniques described herein can be made without departing from the technology of the teachings as defined by the appended claims. Moreover, the scope of the disclosure and claims is not limited to the particular aspects of the process, machine, manufacture, composition of matter, means, methods, and actions described above. Processes, machines, manufacture, compositions of matter, means, methods, or actions, presently existing or later to be developed, that perform substantially the same function or achieve substantially the same result as the corresponding aspects described herein can be utilized. Accordingly, the appended claims include within their scope such processes, machines, manufacture, compositions of matter, means, methods, or actions.

What is claimed is:

1. A method for crowd-based disambiguation of potentially private data resources in a communications network, the method comprising:

receiving, from a private hinting service on a client side of the communications network, a resource identifier at a crowd-disambiguation machine in association with client consumption of a crowd-sourced application of the crowd-disambiguation machine involving requesting a resource corresponding to the resource identifier;

analyzing a set of non-sensitive resources to determine whether the resource identifier is included in the set of non-sensitive resources;

responsive to determining that the resource identifier is not included in the set of non-sensitive resources:

incrementing a stored tally indicating a quantity of instances of the resource identifier received by the crowd-disambiguation machine from unique client machines;

determining, by the crowd-disambiguation machine, whether the stored tally exceeds a predetermined threshold indicating that the resource is non-sensitive;

adding the resource, by the crowd-disambiguation machine, to the set of non-sensitive resources to generate an updated set of non-sensitive resources usable by the crowd-disambiguation machine in providing the crowd-sourced application in response to the determining that the stored tally exceeds the predetermined threshold; and transmitting the updated set of non-sensitive resources to the private hinting service.

2. The method of claim 1, wherein the resource identifier is received as a part of feedback information associated with rendering a web page by one of a plurality of client machines.

3. The method of claim 1, further comprising providing a model of the set of non-sensitive resources to one or more of a plurality of client machines.

4. The method of claim 1, further comprising:
receiving a hint request associated with a first resource from a first client machine;
determining whether the first resource is identified in the set of non-sensitive resources; and
in response to determining that the first resource is identified in the set of non-sensitive resources, providing hint information associated with the first resource to the first client machine.

5. The method of claim 1, further comprising:
receiving a hint request associated with a first resource from a first client machine;
determining whether the first resource is identified in the set of non-sensitive resources; and
in response to determining that the first resource is not identified in the set of non-sensitive resources, providing ambiguated hint information associated with the first resource to the first client machine.

6. The method of claim 1, wherein the resource identifier comprises one or more of a fully ambiguated resource instance (FARI) of the resource or a partially disambiguated resource instance (PDRI) of the resource.

7. The method of claim 1, further comprising:
receiving, by the crowd-disambiguation machine, a second resource identifier, the second resource identifier for a second resource;
incrementing, by the crowd-disambiguation machine, a second stored tally indicating a quantity of instances of the second resource identifier received by the crowd-disambiguation machine from unique client machines;
receiving a hint request from a first client machine, the hint request associated with the second resource;
in response to determining that the second stored tally does not exceed a second predetermined threshold, determining, by the crowd-disambiguation machine, that the second resource is sensitive;
generating a hint response to the hint request, the generating the hint response omitting hint information for the second resource; and
transmitting the hint response to the first client machine.

8. The method of claim 1, further comprising:
receiving, by the crowd-disambiguation machine, a second resource identifier, the second resource identifier for a second resource;
incrementing, by the crowd-disambiguation machine, a second stored tally indicating a quantity of instances of the second resource identifier received by the crowd-disambiguation machine from unique client machines;
receiving a hint request from a first client machine, the hint request associated with the second resource;
in response to determining that the second stored tally does not exceed a second predetermined threshold, determining, by the crowd-disambiguation machine, that the second resource is sensitive;

determining that the first client machine has previously indicated the second resource to the crowd-disambiguation machine;
generating a hint response to the hint request, the generating the hint response comprising hint information for the second resource; and
transmitting the hint response to the first client machine.

9. The method of claim 1, wherein the resource is a uniform resource locator (URL).

10. A system for crowd-based disambiguation of potentially private data resources in a communications network, the system comprising:
means for receiving, from a private hinting service on a client side of the communications network, a resource identifier at a crowd-disambiguation machine from one of a plurality of client machines in association with client consumption of a crowd-sourced application of the crowd-disambiguation machine involving requesting a resource corresponding to the resource identifier;
means for analyzing a set of non-sensitive resources to determine whether the resource identifier is included in the set of non-sensitive resources;
means for incrementing a stored tally indicating a quantity of instances of the resource identifier received by the crowd-disambiguation machine from unique client machines, the incrementing responsive to determining that the resource identifier is included in the set of non-sensitive resources;
means for determining, by the crowd-disambiguation machine, whether the stored tally exceeds a predetermined threshold indicating that the resource is non-sensitive, the determining responsive to determining that the resource identifier is included in the set of non-sensitive resources;
means for adding the resource, by the crowd-disambiguation machine, to the set of non-sensitive resources to generate an updated set of non-sensitive resources usable by the crowd-disambiguation machine in providing the crowd-sourced application in response to the determining that the stored tally exceeds the predetermined threshold; and
means for transmitting the updated set of non-sensitive resources to the private hinting service, the transmitting responsive to adding the resource to the set of non-sensitive resources.

11. The system of claim 10, wherein the resource identifier is received as a part of feedback information associated with rendering a web page by one of a plurality of client machines.

12. The system of claim 10, further comprising means for providing a model of the set of non-sensitive resources to one or more of a plurality of client machines.

13. The system of claim 10, further comprising:
means for receiving a hint request associated with a first resource from a first client machine;
means for determining whether the first resource is identified in the set of non-sensitive resources; and
means for providing hint information associated with the first resource to the first client machine in response to determining that the first resource is identified in the set of non-sensitive resources.

14. The system of claim 10, further comprising:
means for receiving a hint request associated with a first resource from a first client machine;
means for determining whether the first resource is identified in the set of non-sensitive resources; and means for providing ambiguated hint information associated with the first resource to the first client machine in response to determining that the first resource is not identified in the set of non-sensitive resources.

15. The system of claim 10, wherein the resource identifier comprises one or more of a fully ambiguated resource instance (FARI) of the resource or a partially disambiguated resource instance (PDRI) of the resource.

16. The system of claim 10, further comprising:
means for receiving a second resource identifier at a crowd-disambiguation machine, the second resource identifier for a second resource;
means for incrementing a second stored tally at the crowd-disambiguation machine, the second stored tally indicating a quantity of instances of the second resource identifier received by the crowd-disambiguation machine from unique client machines;
means for receiving a hint request from a first client machine, the hint request associated with the second resource;
means for determining that the second resource is sensitive in response to determining that the second stored tally does not exceed a second predetermined threshold;
means for generating a hint response to the hint request, the generating the hint response omitting hint information for the second resource; and
means for transmitting the hint response to the first client machine.

17. The system of claim 10, further comprising:
means for receiving a second resource identifier at a crowd-disambiguation machine, the second resource identifier for a second resource;
means for incrementing a second stored tally at the crowd-disambiguation machine, the second stored tally indicating a quantity of instances of the second resource identifier received by the crowd-disambiguation machine from unique client machines;
means for receiving a hint request from a first client machine, the hint request associated with the second resource;
means for determining that the second resource is sensitive in response to determining that the second stored tally does not exceed a second predetermined threshold;
means for determining that the first client machine has previously indicated the second resource to the crowd-disambiguation machine;
means for generating a hint response to the hint request, the generating the hint response comprising hint information for the second resource; and
means for transmitting the hint response to the first client machine.

18. The system of claim 10, wherein the resource is a uniform resource locator (URL).

19. The method of claim 1, wherein the private hinting service provides private hinting functionality and the crowd-disambiguation machine provides non-private hinting functionality.

20. The system of claim 10, wherein the private hinting service provides private hinting functionality and the crowd-disambiguation machine provides non-private hinting functionality.

* * * * *